United States Patent
Ono et al.

(10) Patent No.: US 11,670,998 B2
(45) Date of Patent: Jun. 6, 2023

(54) CONVEYANCE APPARATUS AND METHOD OF MANUFACTURING ARTICLE

(71) Applicant: CANON KABUSHIKI KAISHA, Tokyo (JP)

(72) Inventors: Tomohiro Ono, Kanagawa (JP); Hitoshi Suzuki, Chiba (JP); Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 17/166,634

(22) Filed: Feb. 3, 2021

(65) Prior Publication Data
US 2021/0249944 A1 Aug. 12, 2021

(30) Foreign Application Priority Data
Feb. 7, 2020 (JP) .............................. JP2020-019513

(51) Int. Cl.
*H02K 41/03* (2006.01)
*B65G 23/23* (2006.01)

(52) U.S. Cl.
CPC ........... *H02K 41/031* (2013.01); *B65G 23/23* (2013.01)

(58) Field of Classification Search
CPC ...... H02K 41/031; H02K 41/03; B65G 23/23; B65G 23/22
USPC ..................................................... 310/12.11
See application file for complete search history.

(56) References Cited

U.S. PATENT DOCUMENTS

2015/0188399 A1* 7/2015 Fukasawa ............ H02K 41/031
310/12.11

FOREIGN PATENT DOCUMENTS

| JP | H07318699 A | 12/1995 | |
| JP | 5240563 B2 * | 7/2013 | |
| JP | 5240563 B2 | 7/2013 | |
| WO | WO-2015056847 A1 * | 4/2015 | .............. B60L 13/04 |

OTHER PUBLICATIONS

Machine translation of JP-5240563-B2. (Year: 2013).*

* cited by examiner

*Primary Examiner* — Michael Andrews
(74) *Attorney, Agent, or Firm* — Canon U.S.A., Inc. I.P. Division

(57) ABSTRACT

A conveyance apparatus includes a stator including a plurality of coils arranged along a first direction and a mover. The mover moves along the plurality of coils and includes a first magnet group including a plurality of first magnets arranged to face the plurality of coils along the first direction, and a second magnet group including a plurality of second magnets arranged to face the plurality of coils along a second direction intersecting with the first direction. At least one of the plurality of coils includes a core, a wire-wound portion wound around the core, and a yoke. The yoke is adjacent to an outer periphery of a portion of the wire-wound portion along the first direction and extends in the first direction.

20 Claims, 16 Drawing Sheets

FIG.13
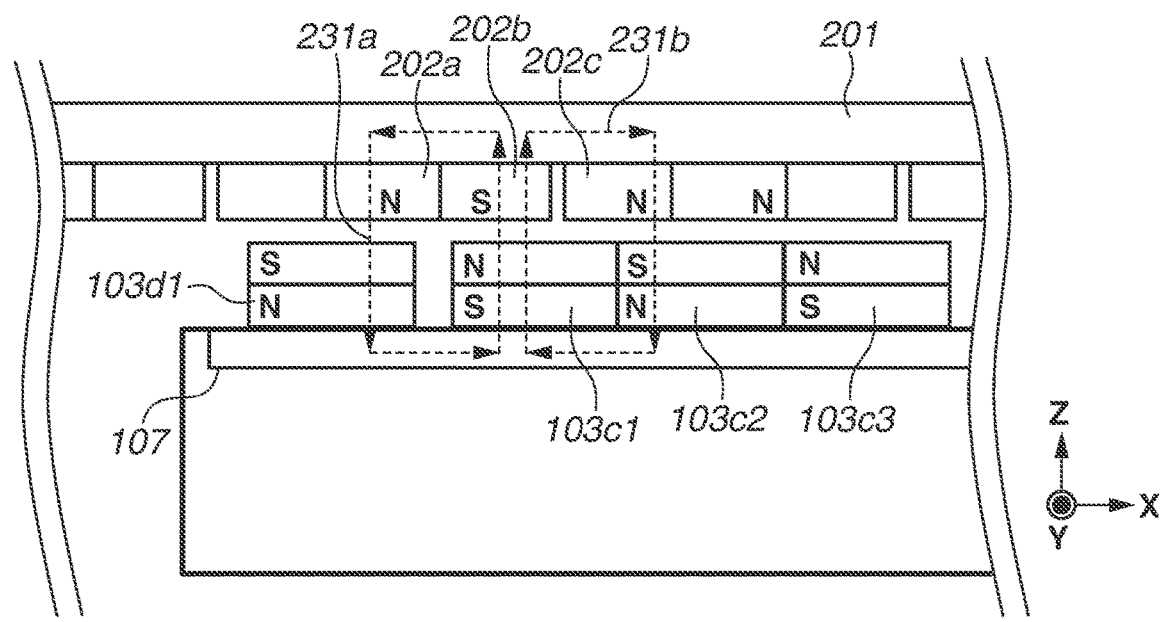
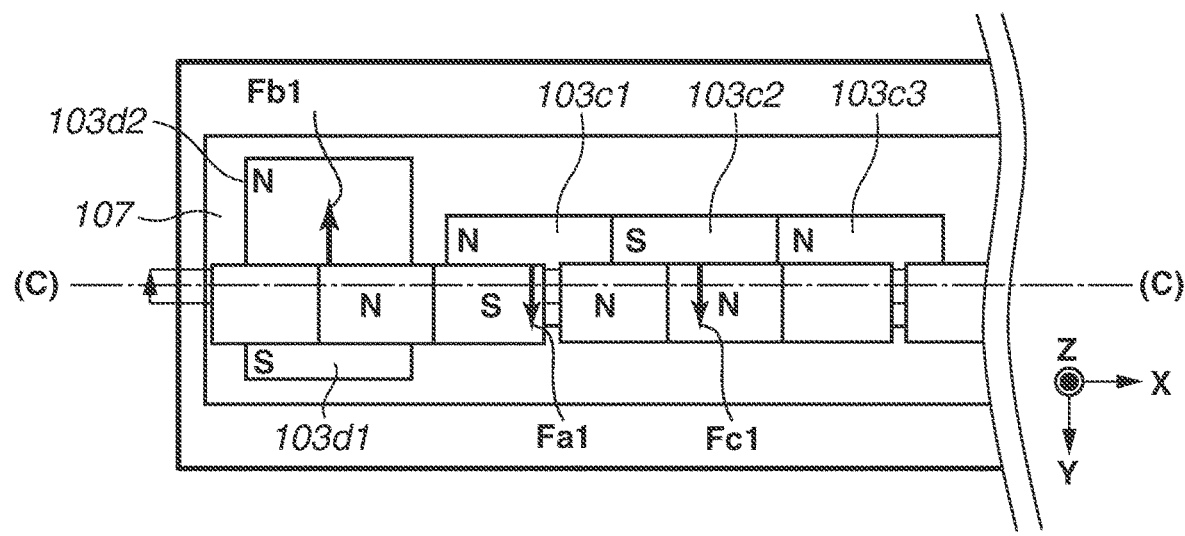

FIG.15
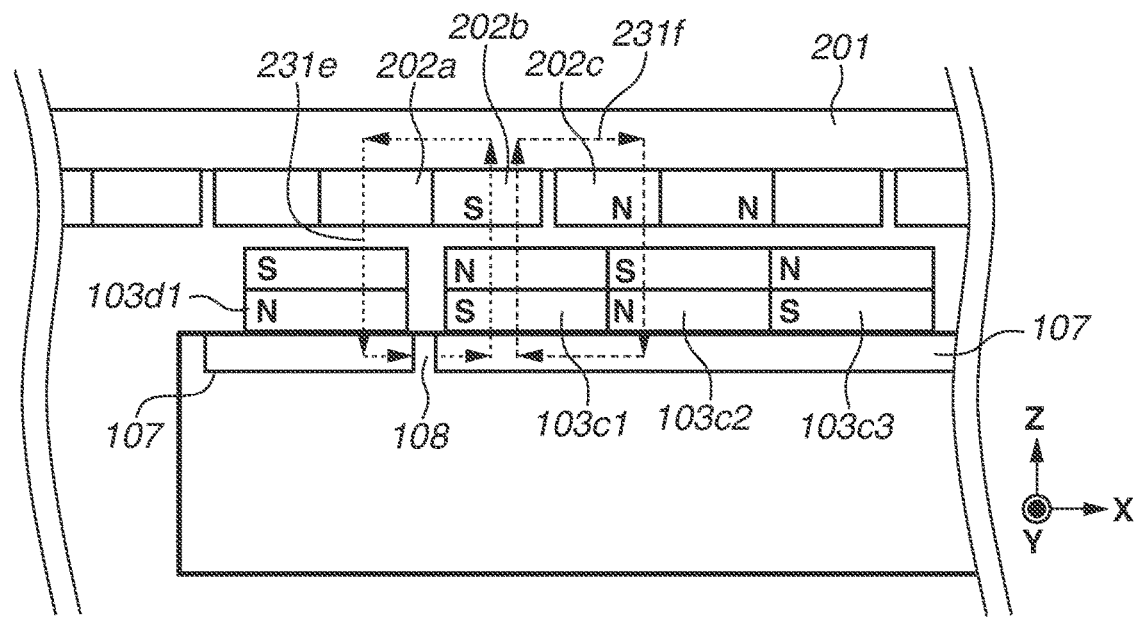
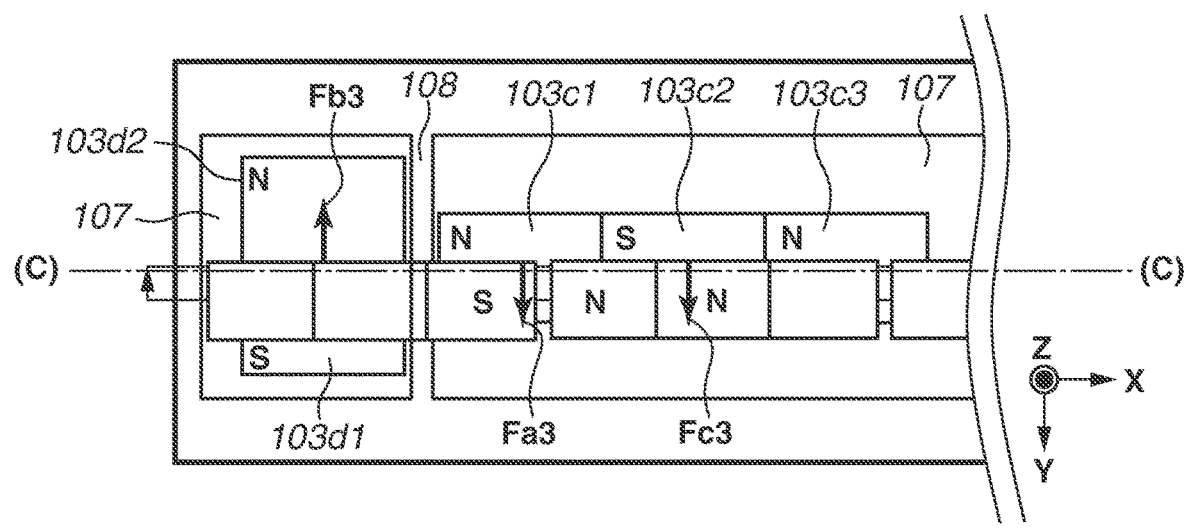

CONVEYANCE APPARATUS AND METHOD OF MANUFACTURING ARTICLE

BACKGROUND

Field

The present disclosure relates to conveyance apparatuses.

Description of the Related Art

In general, conveyance apparatuses are used in production lines for assembling industrial products and in semiconductor exposure apparatuses. Especially, conveyance apparatuses in production lines convey works, such as parts, between a plurality of stations in production lines or between production lines in automated factories. Further, conveyance apparatuses are also used in processing apparatuses. Conveyance apparatuses with movable magnet type linear motors have been offered.

Conveyance apparatuses with movable magnet type linear motors use guiding apparatuses, such as linear guides, that involve mechanical contact. Further, as to a configuration of linear motors, in general, a row of magnets are arranged in a conveyance direction, and a row of coils are arranged to face the row of magnets, and single-axis driving is performed using one of the rows as a mover and the other of the rows as a stator. As discussed in Japanese Patent Application Laid-Open No. 7-318699, two-axis driving in a conveyance direction and a direction perpendicular to the conveyance direction is implemented by perpendicularly arranging two sets of magnets and coils.

Further, Japanese Patent No. 5240563 discusses a conveyance apparatus that performs conveyance in a plurality of axis-directions using a single magnet row and two types of coil rows. The conveyance apparatus discussed in Japanese Patent No. 5240563 includes a single-phase coil around a three-phase coil as a mover and magnet rows that are respectively arranged on both sides of a movement path of the mover to thereby implement two-axis driving.

However, the conventional techniques use two types of coils to perform two-axis driving, and two rows of magnets are used to sandwich the coils. Thus, the apparatuses have a large configuration, and this increases costs.

SUMMARY

According to an aspect of the present disclosure, a conveyance apparatus includes a stator including a plurality of coils arranged along a first direction, and a mover configured to move along the plurality of coils, wherein the mover includes a first magnet group including a plurality of first magnets arranged to face the plurality of coils along the first direction, and a second magnet group including a plurality of second magnets arranged to face the plurality of coils along a second direction intersecting with the first direction, wherein at least one of the plurality of coils includes a core, a wire-wound portion wound around the core, and a yoke, and wherein the yoke is adjacent to an outer periphery of a portion of the wire-wound portion along the first direction and extends in the first direction.

Further features of the present disclosure will become apparent from the following description of exemplary embodiments with reference to the attached drawings.

BRIEF DESCRIPTION OF THE DRAWINGS

FIG. 13 is side and top views illustrating thrust forces in the Y-direction according to the second exemplary embodiment of the present disclosure.

FIG. 15 is side and top views illustrating thrust forces in the Y-direction according to the second exemplary embodiment of the present disclosure.

DESCRIPTION OF THE EMBODIMENTS

A first exemplary embodiment of the present disclosure will be described with reference to FIGS. 1A to 11C.

Figure 1A:
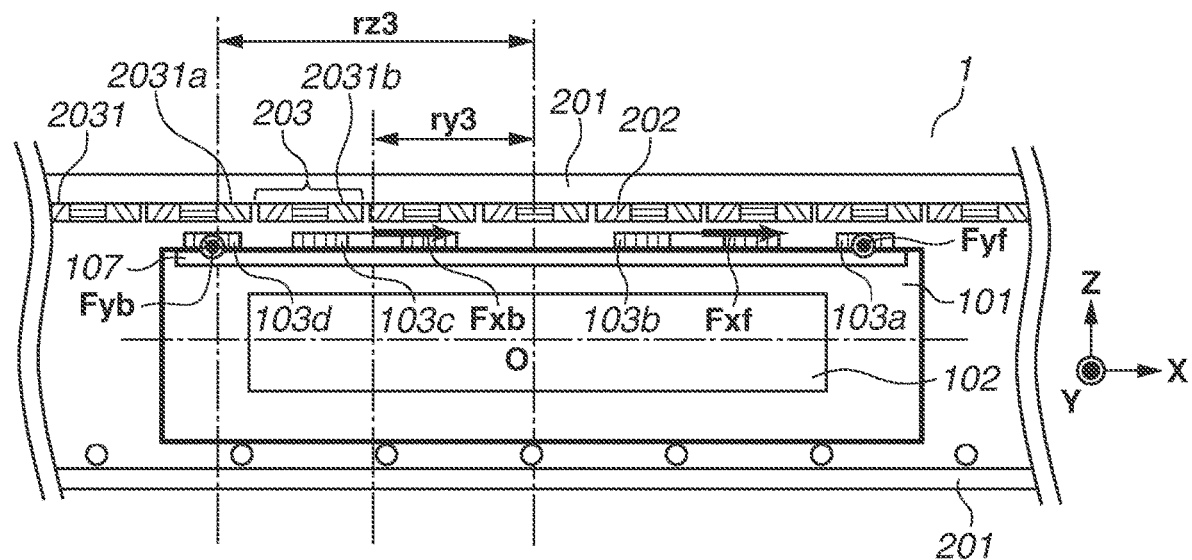
FIGS. 1A and 1B are respectively a side view and a top view illustrating a first exemplary embodiment of the present disclosure.
Figure 1B:
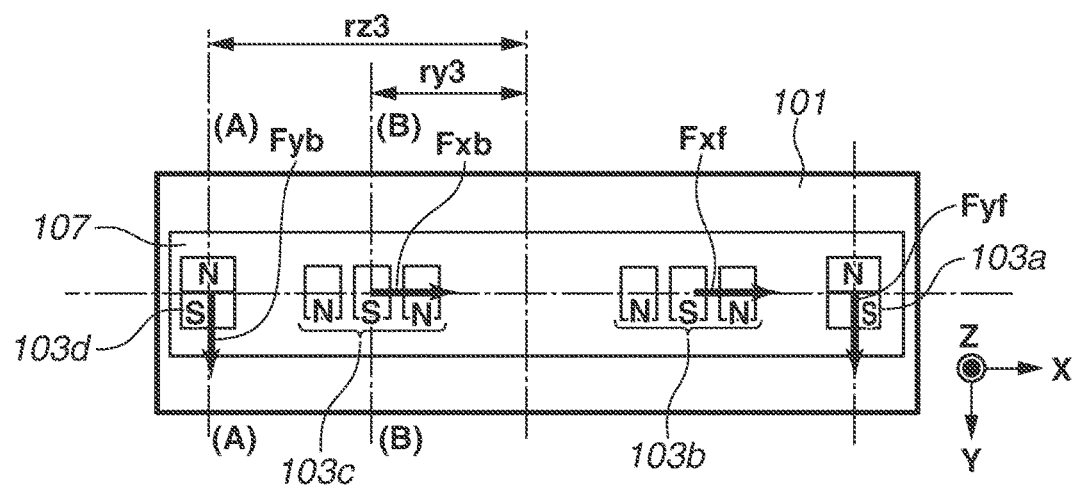

FIGS. 1A and 1B are schematic diagrams illustrating an entire configuration of a conveyance apparatus 1 including a mover 101 and a stator 201 according to the present exemplary embodiment. FIGS. 1A and 1B illustrate extracted main portions of the mover 101 and the stator 201. Further, FIG. 1A illustrates the mover 101 viewed from a Y-direction described below, and FIG. 1B illustrates the mover 101 viewed from a Z-direction described below.

First, coordinate axes and directions used herein will be defined. An X-axis is defined along a horizontal direction, which is a conveyance direction of the mover 101, and the conveyance direction of the mover 101 is defined as an X-direction. Further, a Z-axis is defined along a vertical direction, which is a direction perpendicular to the X-direction, and the vertical direction is defined as the Z-direction. Further, a Y-axis is defined along a direction perpendicular to the X- and Z-directions, and the direction perpendicular to the X- and Z-directions is defined as the Y-direction. Further, a rotation about the Z-axis will be referred to as "rotation Wz". Further, the symbol "*" will be used as a multiplication symbol.

An entire configuration of the conveyance apparatus 1 according to the present exemplary embodiment will be described with reference to FIGS. 1A and 1B.

As illustrated in FIGS. 1A and 1B, the conveyance apparatus 1 according to the present exemplary embodiment includes the mover 101 and the stator 201. The mover 101 constitutes a cart, slider, or carriage, and the stator 201 constitutes a conveyance path. The conveyance apparatus 1 is a conveyance apparatus employing a movable magnet type linear motor (moving permanent magnet type linear motor, movable field type linear motor).

For example, the conveyance apparatus 1 moves the mover 101 by the stator 201 to convey a work 102 on the mover 101 to a processing apparatus that processes the work 102. An article is manufactured with great accuracy by processing the work 102. While one mover 101 is illustrated with respect to the stator 201 in FIGS. 1A and 1B, it is not limited thereto illustrated in FIGS. 1A and 1B. In the conveyance apparatus 1, a plurality of movers 101 can be conveyed over the stator 201.

Figure 2A:
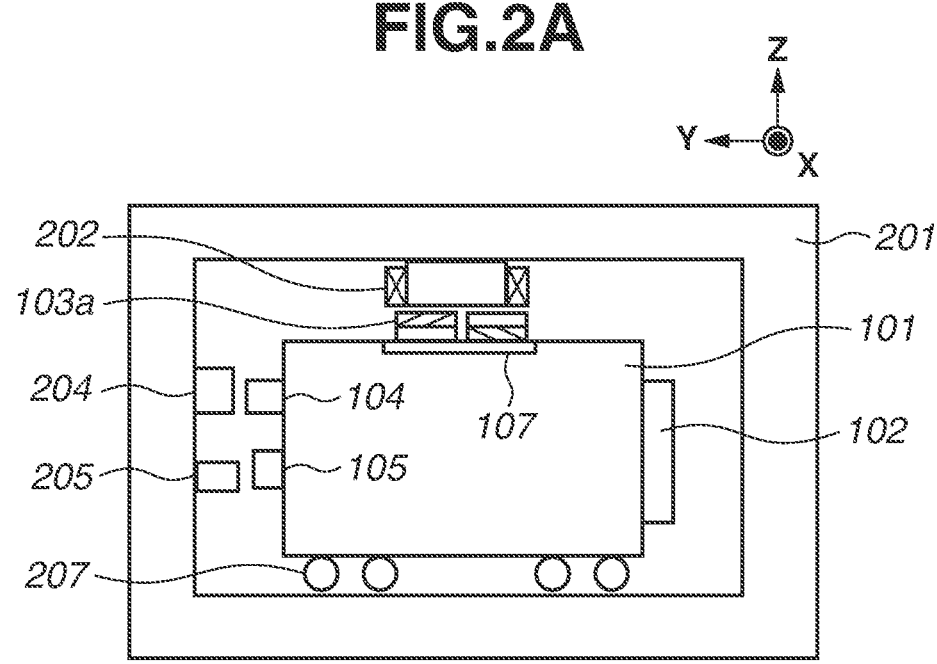
FIGS. 2A and 2B are a cross-sectional view and a cross-sectional view respectively taken along a line (A)-(A) in FIG. 1B and a line (B)-(B) in FIG. 1B.
Figure 2B:
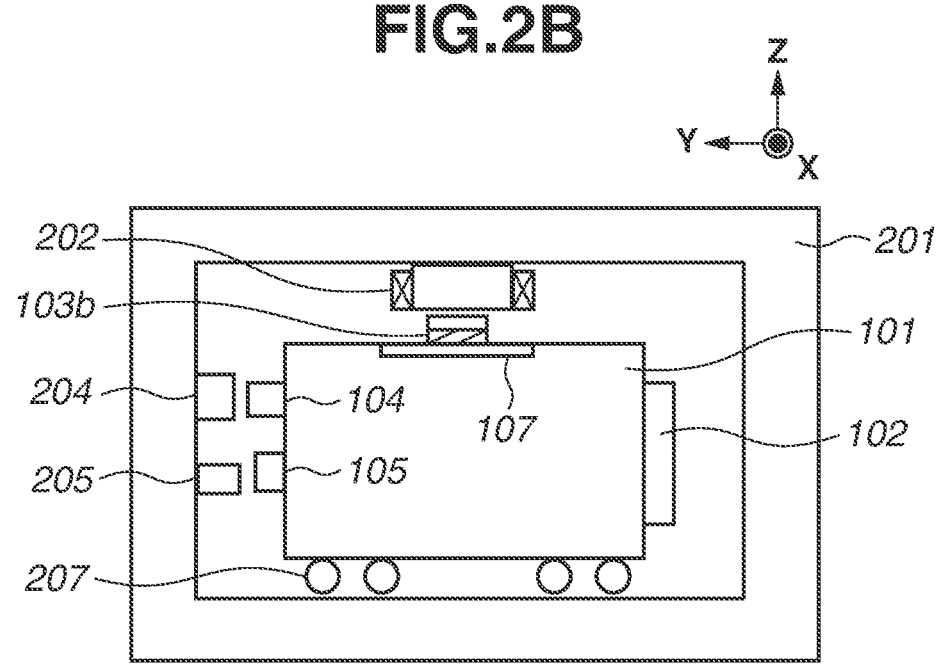

Next, the mover 101, which is a conveyance target of the conveyance apparatus 1 according to the present exemplary embodiment, will be described with reference to FIGS. 1A, 1B, 2A, and 2B. FIGS. 1A and 1B are schematic diagrams illustrating the conveyance apparatus 1 according to the present exemplary embodiment. FIGS. 2A and 2B illustrate the mover 101 and the stator 201 viewed from the X-direction. Further, FIG. 2A illustrates a cross section taken along a line (A)-(A) in FIG. 1B. Further, FIG. 2B illustrates a cross section taken along a line (B)-(B) in FIG. 1B.

As illustrated in FIGS. 1A, 1B, 2A, and 2B, the mover 101 includes permanent magnets 103$a$, 103$b$, 103$c$, and 103$d$ as permanent magnets 103.

The permanent magnets 103 are aligned and attached to a top surface of the mover 101 along the X-direction. More specifically, the permanent magnets 103$a$, 103$b$, 103$c$, and 103$d$ are attached to the top surface of the mover 101. Unless each permanent magnet of the mover 101 needs to be discriminated from the others, the permanent magnet will be referred to as "the permanent magnet 103". When it is needed, each permanent magnet 103 is individually identified by the term "the permanent magnet 103$a$", "the permanent magnet 103$b$", "the permanent magnet 103$c$", or "the permanent magnet 103$d$".

The permanent magnets 103$a$ and 103$d$ are respectively attached to end portions of the top surface of the mover 101 along the X-direction. The permanent magnets 103$b$ and 103$c$ are attached between the permanent magnets 103$a$ and 103$d$ on the top surface of the mover 101. The permanent magnets 103$a$, 103$b$, 103$c$, and 103$d$ are arranged, for example, at an equal pitch in the X-direction.

The permanent magnets 103$a$ and 103$d$ are respectively attached to positions at a distance rz3 from an origin point O, which is a center of the mover 101, on respective sides in the X-direction. The permanent magnets 103$c$ and 103$b$ are respectively attached to positions at a distance ry3 from the origin point O on the respective sides in the X-direction.

Each of the permanent magnets 103$a$ and 103$d$ is a set of two permanent magnets arranged along the Y-direction. The two permanent magnets of each of the permanent magnets 103$a$ and 103$d$ are arranged along the Y-direction so that polarities of external magnetic poles facing the stator 201 are different from each other. The number of permanent magnets of each of the permanent magnets 103$a$ and 103$d$ that are arranged along the Y-direction is not limited to two and can be any number more than one. Further, the direction in which the permanent magnets of the permanent magnets 103$a$ and 103$d$ are arranged does not necessarily have to be the Y-direction perpendicular to the X-direction, which is the conveyance direction, and can be any direction intersecting with the X-direction. In other words, the permanent magnets 103$a$ and 103$d$ each can be a magnet group of a plurality of permanent magnets arranged along a direction intersecting with the X-direction so that magnetic poles have alternating polarities.

On the other hand, each of the permanent magnets 103$b$ and 103$c$ is a set of three permanent magnets arranged along the X-direction. The three permanent magnets of each of the permanent magnets 103$b$ and 103$c$ are arranged along the X-direction so that external magnetic poles facing the stator 201 have alternating polarities. The number of permanent magnets of each of the permanent magnets 103$b$ and 103$c$ that are arranged along the X-direction is not limited to three and can be any number more than one. In other words, the permanent magnets 103$b$ and 103$c$ each can be a magnet group of a plurality of permanent magnets arranged along the X-direction so that magnetic poles have alternating polarities.

In the present specification, a plurality of permanent magnets arranged along the X-direction is sometimes referred to as "first magnet group". A permanent magnet of the first magnet group is sometimes referred to as "first magnet". A plurality of permanent magnets arranged along a direction intersecting with the X-direction is sometimes referred to as "second magnet group". A permanent magnet of the second magnet group is sometimes referred to as "second magnet". The first magnet group and/or the second magnet group are/is sometimes referred to as "magnet group". Further, the first and second magnets are not limited to permanent magnets and can be electromagnets.

Each permanent magnet 103 is attached to a yoke-for-magnet 107 on the top surface of the mover 101. The yoke-for-magnet 107 is made of a magnetic material or a material with a great magnetic permeability, e.g., iron. As used herein, the term "a material with a great magnetic permeability" refers to a material with a relative magnetic permeability of 1000 or more.

The mover 101 with the permanent magnets 103 arranged thereon is moved while an orientation of the mover 101 is three-axis controlled by an electromagnetic force applied to the permanent magnets 103 by electric current flowing through a plurality of coils 202 of the stator 201 as described below.

The mover 101 is movable in the X-direction along the plurality of coils 202 arranged along the X-direction. The mover 101 is conveyed with the work 102 to be conveyed placed on or attached to a top, side, or lower surface of the mover 101. The mover 101 may include, for example, a holding mechanism such as a work holder to hold the work 102 on the mover 101.

Next, the stator 201 of the conveyance apparatus 1 according to the present exemplary embodiment will be described with reference to FIGS. 1A, 2A, 2B, and 3.

Figure 3:
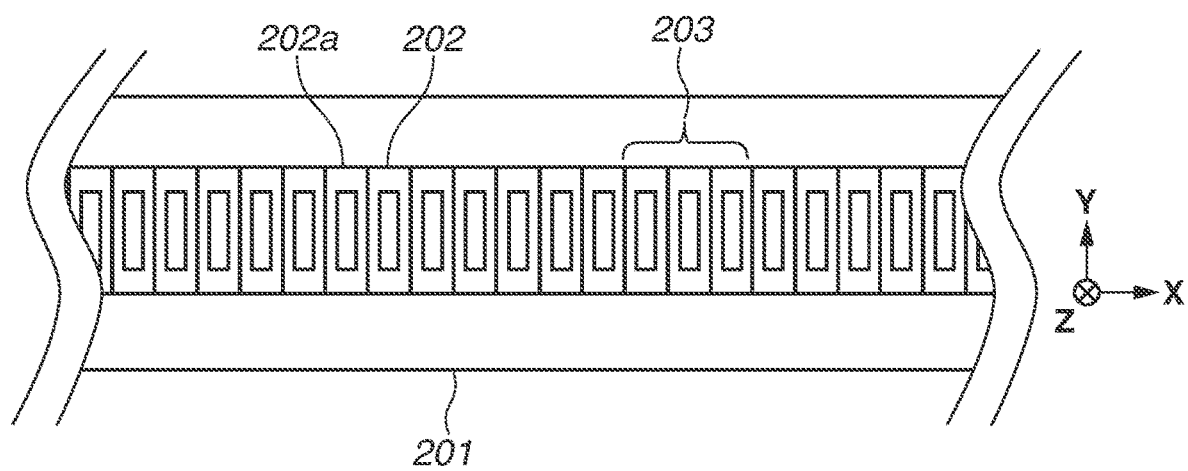
FIG. 3 is a cross-sectional view illustrating a stator portion in FIG. 1A.

FIG. 3 is a schematic diagram illustrating the coils 202 of the stator 201. FIG. 3 illustrates the coils 202 viewed upward from the bottom in the Z-direction.

The stator 201 includes the plurality of coils 202 aligned along the X-direction, which is the conveyance direction of the mover 101. The plurality of coils 202 is attached to the stator 201 to face the mover 101. The stator 201 extends in the X-direction, which is the conveyance direction (first direction), and forms the conveyance path for the mover 101.

As illustrated in FIGS. 1A, 1B, 2A, and 2B, the mover 101 to be conveyed along the stator 201 includes a linear scale 104 and a Y-target 105. The linear scale 104 and the Y-target 105 are each attached to, for example, a side surface portion of the mover 101 along the X-direction.

The stator 201 includes the plurality of coils 202, a plurality of linear encoders 204, a plurality of Y-sensors 205, and a plurality of ball rollers 207. In this case, the ball rollers 207 are used as a guide for the mover 101 during conveyance, but ball rollers do not necessarily have to be used, and a method of conveyance in a state of slight levitation with air may be employed.

The plurality of coils 202 is aligned along the X-direction and attached to the stator 201 to face the permanent magnets 103 on the top surface of the mover 101. The plurality of coils 202 is aligned along the X-direction to face the permanent magnets 103a, 103b, 103c, and 103d of the mover 101.

In the present exemplary embodiment, the row of the coils 202 facing the mover 101 are arranged to face the permanent magnets 103a and 103d and the permanent magnets 103b and 103c including the plurality of permanent magnets arranged in a direction different from a direction in which the plurality of permanent magnets of the permanent magnets 103a and 103d is arranged. Thus, a force is applied to the mover 101 in the conveyance direction and in a direction different from the conveyance direction with a smaller number of rows of the coils 202 as described below, so that the conveyance and orientation controls of the mover 101 can be achieved.

As described above, the plurality of coils 202 is attached along the conveyance direction of the mover 101. The plurality of coils 202 is arranged at predetermined intervals in the X-direction. Further, each coil 202 is attached with a central axis of the coil 202 facing in the Z-direction. Each coil 202 includes a core with an electric wire wound around the core, and in the present exemplary embodiment, a coil position refers to a core position.

The electric current to the plurality of coils 202 is controlled in units of, for example, three coils 202. Each unit of the coils 202 for the control of electric current application will be referred to as "coil unit 203". Application of the electric current to the coils 202 generates an electromagnetic force acting between the coils 202 and the permanent magnets 103 of the mover 101 so that a force is applied to the mover 101.

The coil units 203 may be accommodated in coil boxes 2031 sob as to accommodates a plurality of coils 202, a single coil unit 203, or a plurality of coil units 203 as illustrated in FIG. 1A, and coil boxes 2031a and 2031b storing the coil units 203 may be arranged along the X-direction. In the present exemplary embodiment, the plurality of coils 202, the single coil unit 203, or the plurality of coil units 203 accommodated in each coil box 2031 is sometimes referred to as a "coil group".

Next, the coils 202 according to the present exemplary embodiment will be described with reference to FIGS. 4A and 4B. FIG. 4B is a cross-sectional view illustrating the coil 202 according to the present exemplary embodiment.

Figure 4A:
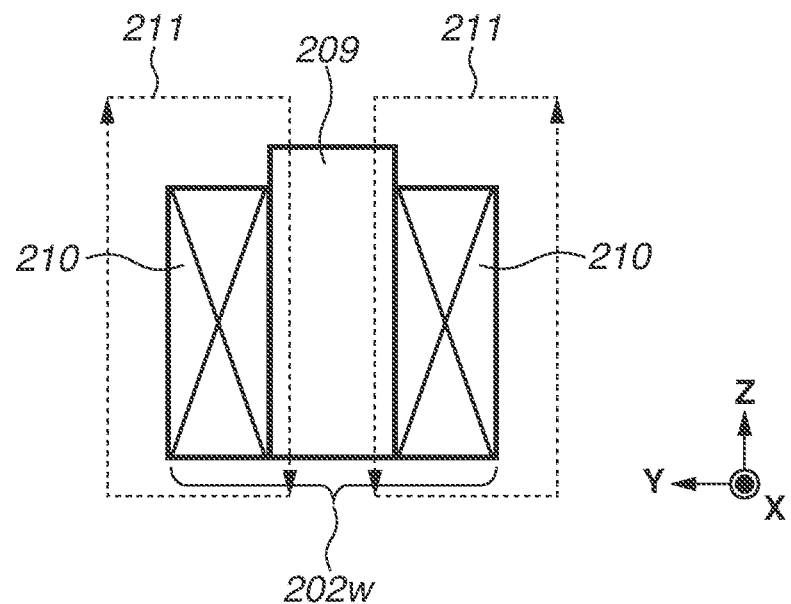
FIGS. 4A and 4B are cross-sectional views respectively illustrating a general coil and a coil according to the first exemplary embodiment of the present disclosure
Figure 4B:
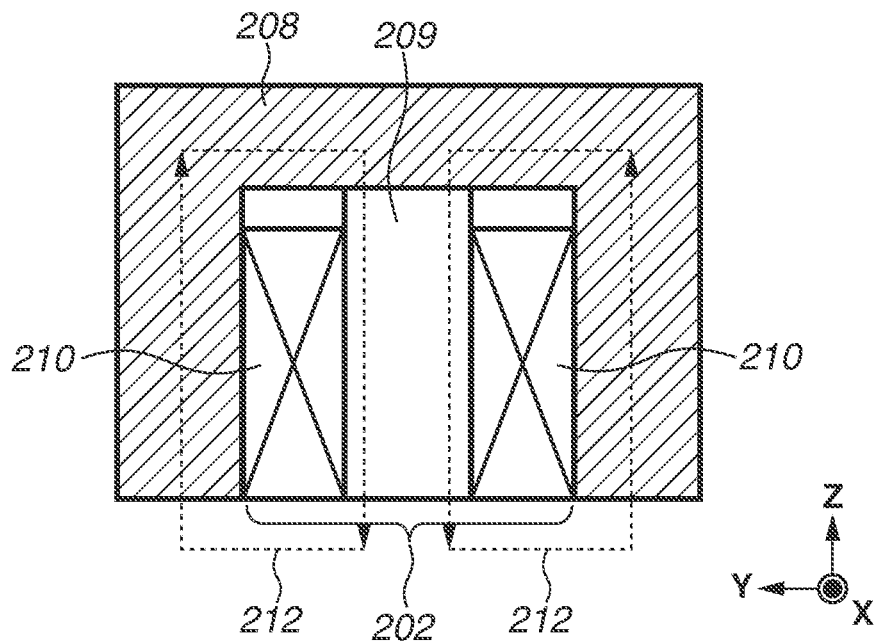

For ease of understanding, FIG. 4A illustrates a conceptual diagram of a general coil 202w. The coil 202w includes a core 209w and a wire-wound portion 210w where an electric wire is wound.

FIG. 4B is a conceptual diagram illustrating the coil 202 according to the present exemplary embodiment. FIG. 4B illustrates one of the plurality of coils 202 illustrated in FIG. 3. At least one of the plurality of coils 202 according to the present exemplary embodiment includes a coil yoke 208 as illustrated in FIG. 4B. More specifically, the coil 202 according to the present exemplary embodiment includes a core 209, a wire-wound portion 210, and the coil yoke 208. The coil yoke 208 is connected to the core 209 and arranged on a magnetic path formed by applying the electric current to the wire-wound portion 210. For example, the coil yoke 208 is arranged adjacent to an outer periphery of the wire-wound portion 210 along the conveyance direction (first direction) as illustrated in FIG. 4B. The coil yoke 208 is made of a magnetic material or a material with a great magnetic permeability, for example, iron. In the present specification, the term "a material with a great magnetic permeability" refers to a material with a relative magnetic permeability of 1000 or more. Further, the coil yoke 208 and the wire-wound portion 210 do not necessarily have to be in contact with each other.

The shape of the coil yoke 208 does not necessarily have to be those described above, and the coil yoke 208 and the core 209 do not have to be connected. For example, the coil yoke 208 may be attached along the conveyance direction to sandwich both sides of a surface of the coil 202 in the Y-direction, and the shape of the coil yoke 208 is not particularly limited. However, the coil yoke 208 is desirably connected to a surface of the core 209 opposite to a surface of the core 209 that faces the mover 101 or to a side surface of the core 209.

Figure 5A:
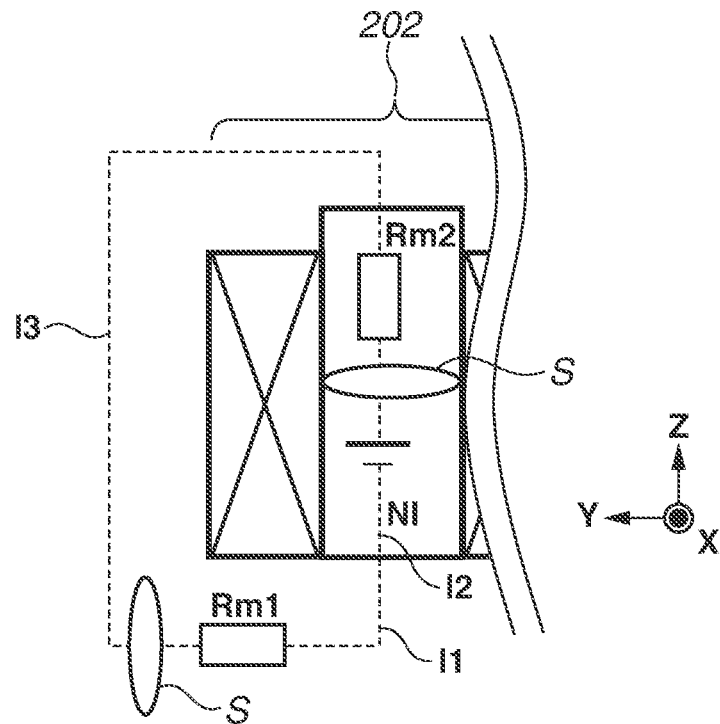
FIGS. 5A and 5B are conceptual diagrams illustrating a magnetic circuit of the coil according to the first exemplary embodiment of the present disclosure.
Figure 5B:
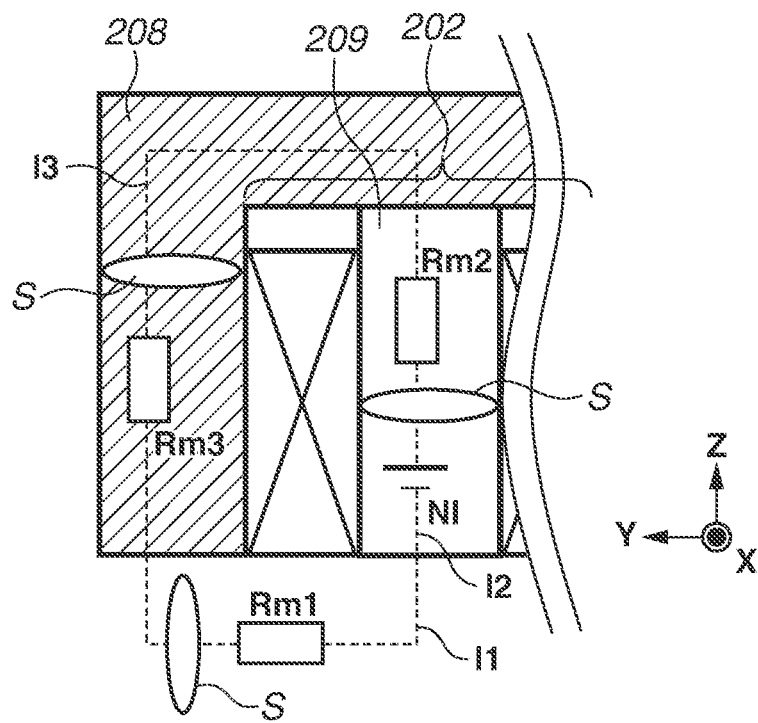

Next, changes in magnetic flux in the coil 202w in FIG. 4A and the coil 202 in FIG. 4B will be described with reference to FIGS. 5A and 5B. FIG. 5A is a conceptual diagram illustrating a magnetic circuit in a case where the coil yoke 208 is not attached, and FIG. 5B is a conceptual diagram illustrating a magnetic circuit in a case where the coil yoke 208 is attached. The conceptual diagrams in FIGS. 5A and 5B are enlarged views of portions in FIGS. 4A and 4B.

In FIG. 4A, magnetic paths 211 are formed in an atmosphere and in the core 209. A magnetic flux Φ [Wb] of the magnetic circuit that is generated in FIG. 5A in this case will be described. For simplification, the number N of turns in the coil 202, an electric current I [A], and a cross-sectional area S [m$^2$] are defined to be constant, and the relative magnetic permeability in the atmosphere is approximated to one. Further, it is assumed that a material of the core 209 is iron.

In the atmosphere, for simplification, a magnetic path with a cross-sectional area S [m$^2$] and magnetic path lengths l1 [m] and l3 [m] as specified by a broken line portion in FIG. 5A is formed, and the permeability in this case is defined to be μ0 [H/m] and the magnetic resistance in this case is defined to be Rm1 [1/H].

Similarly, a magnetic path with a magnetic path length l2 [m] and a cross-sectional area S [m$^2$] is formed at the core 209, and the magnetic permeability in this case is defined to be μ0*μr1 [H/m] and the magnetic resistance is defined to be Rm2 [1/H]. Further, the magnetomotive force is defined to be N*I.

The magnetic resistances Rm1 and Rm2 and the magnetic flux Φ are expressed by the following formulas 1a to 1c.

$$Rm1 = (l1+l3)/(\mu 0*S) \quad (1a)$$

$$Rm2 = l2/(\mu 0*\mu r1*S) \quad (1b)$$

$$\Phi = N*I/(Rm1+Rm2) \quad (1c)$$

Next, in FIG. 4B, a magnetic path 212 is formed in an atmosphere, the core 209, and the coil yoke 208. A magnetic flux Φ [Wb] of the magnetic circuit that is generated similarly in FIG. 5B in this case will be described. For simplification, the number N of turns in the coil, an electric current I [A], and a cross-sectional area S [m$^2$] are defined to be constant, and the relative permeability in the atmosphere is approximated to one. Further, it is assumed that materials of the core 209 and the coil yoke 208 are iron.

In the atmosphere, for simplification, a magnetic path with a cross-sectional area S [m$^2$] and a magnetic path length 11 [m] as specified by a broken line portion in FIG. 5B is formed, and the magnetic permeability in this case is defined to be μ0 [H/m] and the magnetic resistance is defined to be Rm1 [1/H].

In the core 209, a magnetic path with a magnetic path length l2 [m] and a cross-sectional area S [m$^2$] is formed, and the magnetic permeability in this case is defined to be μ0*μr1 [H/m] and the magnetic resistance in this case is defined to be Rm2 [1/H].

In the coil yoke 208, a magnetic path with a magnetic path length 13 [m] and a cross-sectional area S [m$^2$] is formed, and the magnetic permeability in this case is defined to be μ0*μr2 [H/m] and the magnetic resistance is defined to be Rm3 [1/H]. Further, the magnetomotive force is defined to be N*I.

The magnetic resistance Rm and the magnetic flux Φ in this case are expressed by the following formulas 2a to 2d.

$$Rm1 = l1/(\mu 0*S) \quad (2a)$$

$$Rm2 = l2/(\mu 0*\mu r1*S) \quad (2b)$$

$$Rm3 = l3/(\mu 0*\mu r2*S) \quad (2c)$$

$$\phi = N*I/(Rm1+Rm2+Rm3) \quad (2d)$$

In general, the magnetic permeability of iron is about 5000 to 200000 times the magnetic permeability in a vacuum and is significantly high. Further, the magnetic permeability in a vacuum is substantially equal to the magnetic permeability in an atmosphere, so that μr2 can be approximated to one. Thus, from a comparison between formulas 1a to 1c and formulas 2a to 2d, it is understood that l3/(μ0*μr2*S) in formulas 2a to 2d is significantly smaller than l3/(μ0*S) of Rm1 in formulas 1a to 1c. Thus, in FIG. 4B, the magnetic resistance is decreased by the addition of the coil yoke 208.

From those described above, it is understood that the magnetic flux Φ in FIG. 4B in which the coil yoke 208 is added is increased compared to the magnetic flux Φ in FIG. 4A.

Figure 6:
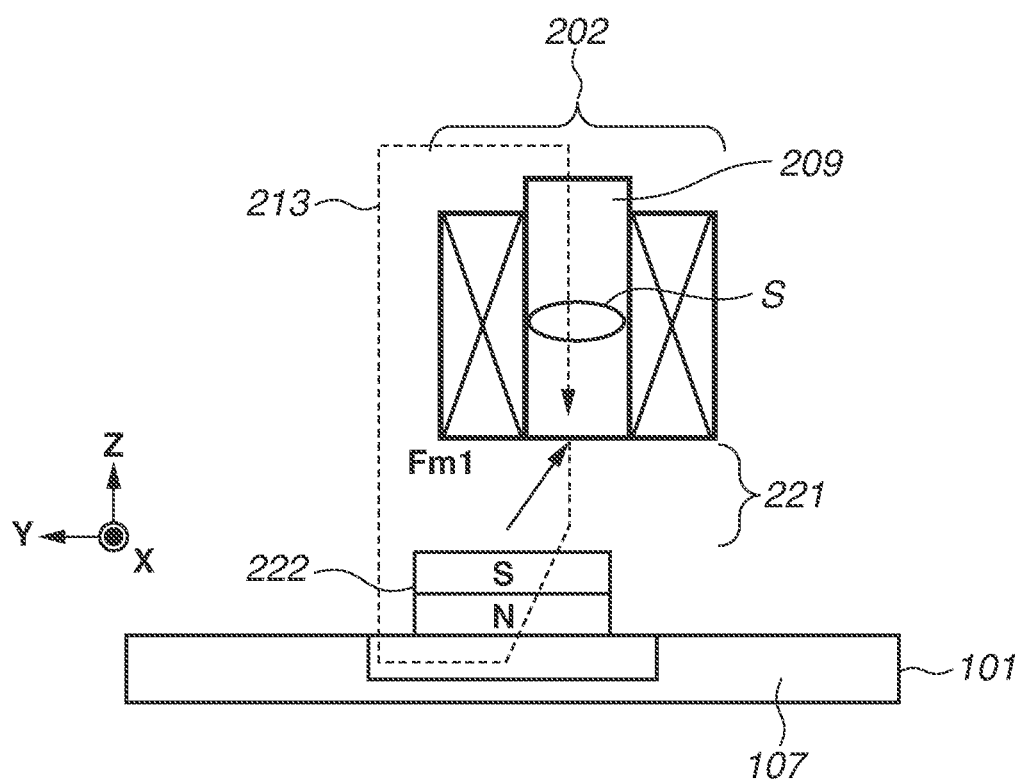
FIG. 6 is a conceptual diagram illustrating a method of applying a force in a Y-direction according to the first exemplary embodiment of the present disclosure.

Next, a relationship between the magnetic flux Φ and a thrust force Fy in the Y-direction will be described with reference to FIG. 6. FIG. 6 is a cross-sectional view illustrating the coil 202w and the mover 101 that are common. For simplification, the mover 101 with a single permanent magnet 222 attached thereto will be described below.

The cross-sectional area of the coil core 209 is defined to be [m$^2$], the magnetic flux density in an atmosphere is defined to be μ0 [Wm], and the magnetic flux density of a space gap 221 between the coil 202w and the mover 101 is defined to be B [Wb/m$^2$].

When an electric current is applied to the coil 202w so that the mover 101 becomes an N-pole, a magnetic path 213 is formed in the mover 101 and the coil 202w. A magnetic energy Wm of the space gap 221 per unit area is expressed by the following formula:

$$Wm = B^2/\mu 0 \ [N/m^2] \quad (3)$$

An attractive force Fm is expressed by the following formula obtained by multiplying the formula (3) by the cross-sectional area S:

$$Fm = S*B^2/\mu 0 \ [N] \quad (4)$$

The magnetic flux density B is expressed as the magnetic flux Φ per unit area and is thus expressed as follows:

$$B = \Phi/S [Wb/m^2] \quad (5)$$

From formulas 4 and 5 it is understood that the attractive force Fm is expressed by the magnetic flux Φ.

$$Fm = \Phi^2/2*\mu 0*S [N] \quad (6)$$

In this case, the attractive force Fm is a force Fm1 acting between the coil core 209 and a permanent magnet 103d1, and the force Fm1 can be divided into a force Fm1z in the Z-direction and a force Fm1y in the Y-direction. The thrust force Fy in the Y-direction is a component force in the Y-direction and is denoted by Fm1y.

Thus, it is understood that in a case where the magnetic flux Φ increases, the thrust force Fy also increases. From this fact, it is understood that the inclusion of the coil yoke 208 increases the magnetic flux Φ, so that thrust force Fy in the Y-direction can be increased.

Further, a case where a permanent magnet having polarities opposite to those of the permanent magnet 222 is attached adjacently on the negative Y-direction side as specified by the permanent magnet 103d in FIG. 1B will be discussed. In this case, a force acting between the attached permanent magnet and the coil core 209 is a repelling force, and the thrust force in the Y-direction together with the thrust force Fm1y approximately doubles.

Figure 7:
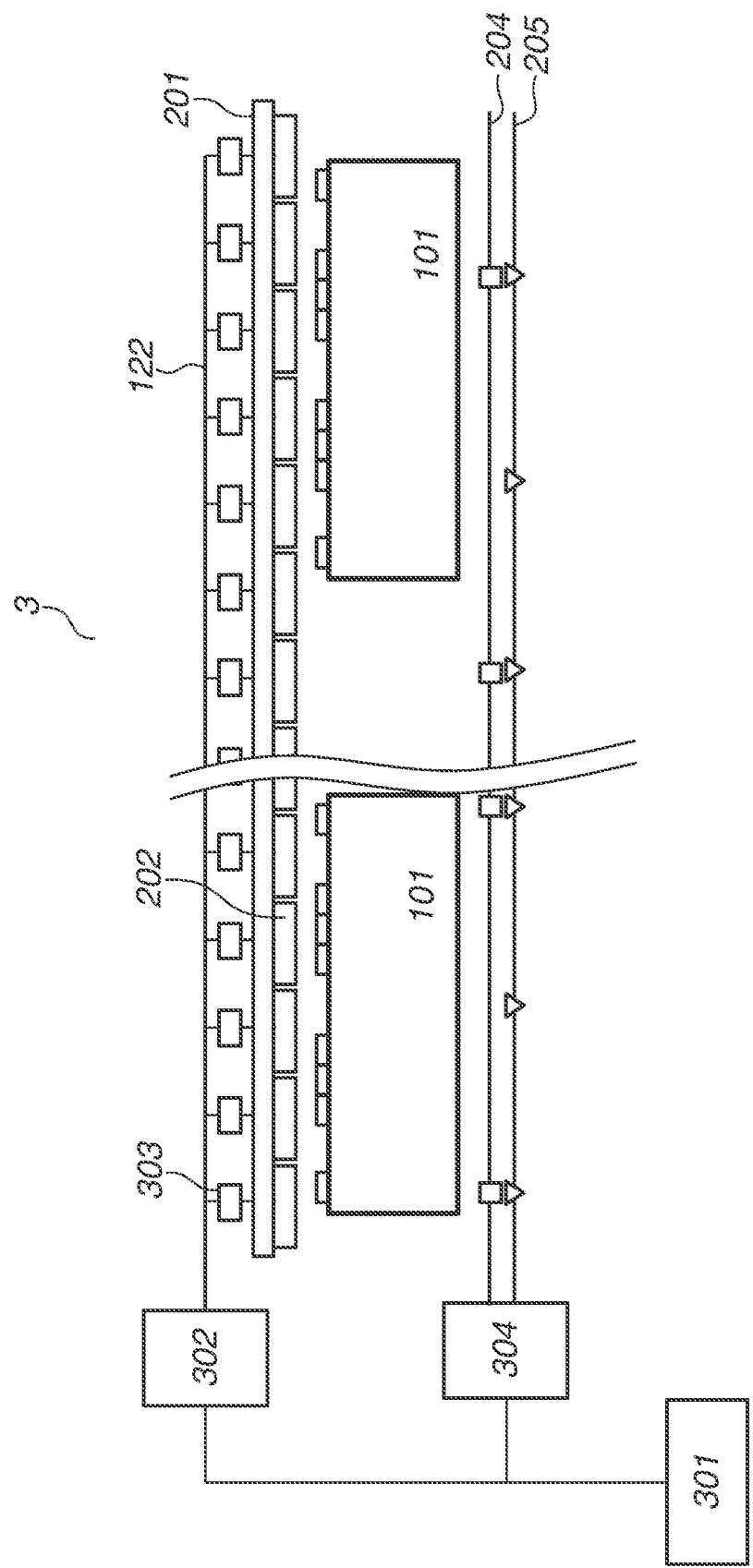
FIG. 7 is a schematic diagram illustrating a system configuration according to the first exemplary embodiment of the present disclosure.

Next, a control system that controls the conveyance apparatus 1 according to the present exemplary embodiment will be described further with reference to FIG. 7. FIG. 7 is a schematic diagram illustrating a control system 3 that controls the conveyance apparatus 1 according to the present exemplary embodiment.

The plurality of linear encoders 204 is attached to the stator 201 along the X-direction to face the linear scale 104 of the mover 101. Each of the linear encoders 204 reads the linear scale 104 attached to the mover 101 to detect a relative position of the mover 101 with respect to the linear encoders 204 and outputs the detected relative position.

The plurality of Y-sensors 205 is attached to the stator 201 along the X-direction to face the Y-target 105 of the mover 101. Each of the Y-sensors 205 detects a relative distance to the Y-target 105 of the mover 101 in the Y-direction and outputs the detected relative distance. The Y-target 105 is a projecting portion having a surface parallel to the conveyance direction that is a target of the mover 101, and the surface parallel to the conveyance direction that is a target of the mover 101 is measured by the Y-sensors 205 fixed to the stator 201. In this way, an orientation of the mover 101 in the Y-direction is detected. The relative distance to the mover 101 can be detected directly, but there are cases where it is difficult to process the mover 101 with great accuracy, so that the Y-target 105 can be used in such cases.

As illustrated in FIG. 7, the control system 3 includes an integrated controller 301, a coil controller 302, and a sensor controller 304 and functions as a control apparatus that controls the conveyance apparatus 1 including the mover 101 and the stator 201. The coil controller 302 is communicably connected to the integrated controller 301. Further, the sensor controller 304 is communicably connected to the integrated controller 301.

A plurality of electric current controllers 303 is communicably connected to the coil controller 302. The coil controller 302 and the plurality of electric current controllers 303 connected to the coil controller 302 are arranged to correspond to a single row of the coils 202. The coils 202 may be connected to each electric current controller 303, the plurality of coils 202 may be connected to each electric current controller 303, the coil unit 203 (not illustrated) may be connected to each electric current controller 303, or the plurality of coil units 203 may be connected to each electric current controller 303. The electric current controllers 303 can control the magnitude of an electric current to be applied to each coil 202 of the connected coil unit 203.

The coil controller 302 provides an instruction of a target electric current value to each connected electric current controller 303. The electric current controllers 303 controls an amount of electric current of each connected coil 202.

The plurality of linear encoders 204 and the plurality of Y-sensors 205 are communicably connected to the sensor controller 304.

The plurality of linear encoders 204 is attached to the stator 201 at intervals at which one of the plurality of linear encoders 204 can measure the position of one mover 101 even during conveyance of the mover 101. Further, the plurality of Y-sensors 205 is attached to the stator 201 at intervals at which two of the plurality of Y-sensors 205 can measure the Y-target 105 of one mover 101.

The integrated controller 301 determines an electric current instruction value to be applied to the plurality of coils 202 based on outputs from the linear encoders 204 and the Y-sensors 205 and transmits the determined electric current instruction value to the coil controller 302. The coil controller 302 provides an electric current value to the electric current controllers 303 as described above based on the electric current instruction value from the integrated controller 301. In this way, the integrated controller 301 functions as a control apparatus and conveys the mover 101 along the stator 201 while performing three-axis controlling of the orientation of the mover 101.

Figure 8:
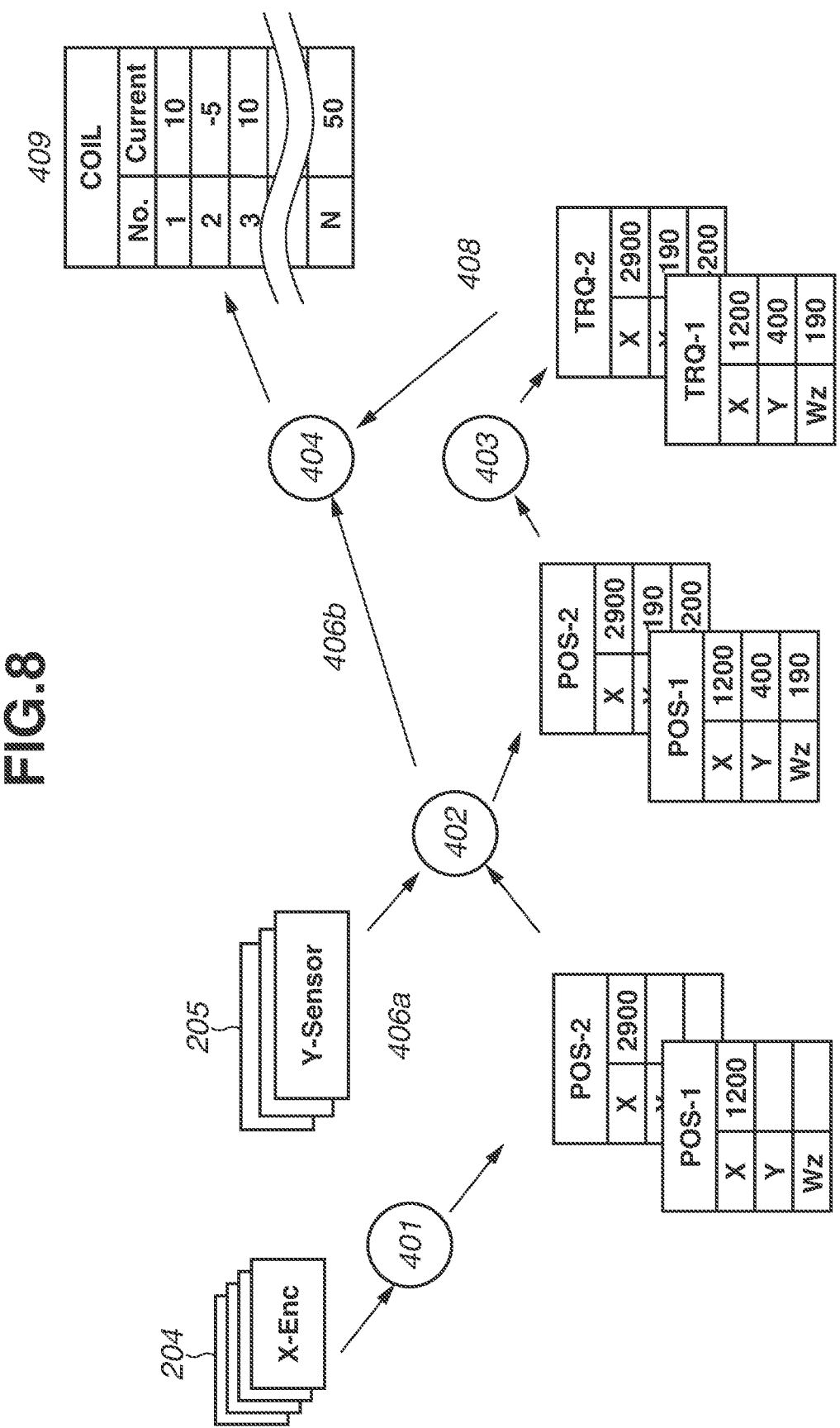
FIG. 8 is a schematic diagram illustrating an orientation control method according to the first exemplary embodiment of the present disclosure.

A method of controlling the orientation of the mover 101 performed by the integrated controller 301 will be described with reference to FIGS. 7 and 8. FIG. 8 is a schematic diagram illustrating a method of controlling the orientation of the mover 101 in the conveyance apparatus 1 according to the present exemplary embodiment. FIG. 8 schematically illustrates the method of controlling the orientation of the mover 101, focusing mainly on a flow of data. The integrated controller 301 executes processing using a mover position calculation function 401, a mover orientation calculation function 402, a mover orientation control function 403, and a coil electric current calculation function 404 as described below. With this processing, the integrated controller 301 controls conveyance of the mover 101 while performing three-axis controlling of the orientation of the mover 101. Instead of the integrated controller 301, the coil controller 302 can be configured to execute processing similar to that of the integrated controller 301.

First, the mover position calculation function 401 calculates the number of the movers 101 over the stator 201 constituting the conveyance path and the position of each mover 101 based on measurement values from the plurality of linear encoders 204 and attachment position information about the plurality of linear encoders 204. With this processing, the mover position calculation function 401 updates mover position information (X) and number-of-movers information of mover information 406, which is information about the movers 101. The mover position information (X) indicates a position in the X-direction, which is the conveyance direction of the mover 101, over the stator 201. The mover information 406 is prepared for, for example, each mover 101 over the stator 201 as specified by POS-1, POS-2, . . . in FIG. 8.

Next, the mover orientation calculation function 402 identifies, for each mover 101, the Y-sensors 205 that can measure the mover 101 based on the mover position information (X) of the mover information 406 that is updated by the mover position calculation function 401. Then, the mover orientation calculation function 402 calculates orientation information (Y, Wz), which is information about the orientation of each mover 101, based on values output from the identified Y-sensors 205 and updates the mover information 406. The mover information 406 updated by the mover orientation calculation function 402 contains the mover position information (X) and the orientation information (Y, Wz).

Next, the mover orientation control function 403 calculates application force information 408 about each mover 101 based on the current mover information 406 including the mover position information (X) and the orientation information (Y, Wz) and an orientation target value. The application force information 408 is information about the magnitude of a force to be applied to each mover 101. The application force information 408 contains information about two-axis force components (Tx, Ty) and one-axis torque component (Twz) of a force T to be applied, which will be described below. The application force information 408 is prepared for, for example, each mover 101 over the stator 201 as specified by TRQ-1, TRQ-2, . . . in FIG. 8.

Next, the coil electric current calculation function 404 determines an electric current instruction value 409 to be applied to each coil 202 based on the application force information 408 and the mover information 406.

The integrated controller 301 executes processing using the mover position calculation function 401, the mover orientation calculation function 402, the mover orientation control function 403, and the coil electric current calculation function 404 as described above to determine the electric current instruction value 409. The integrated controller 301 transmits the determined electric current instruction value 409 to the coil controller 302.

Figure 9:
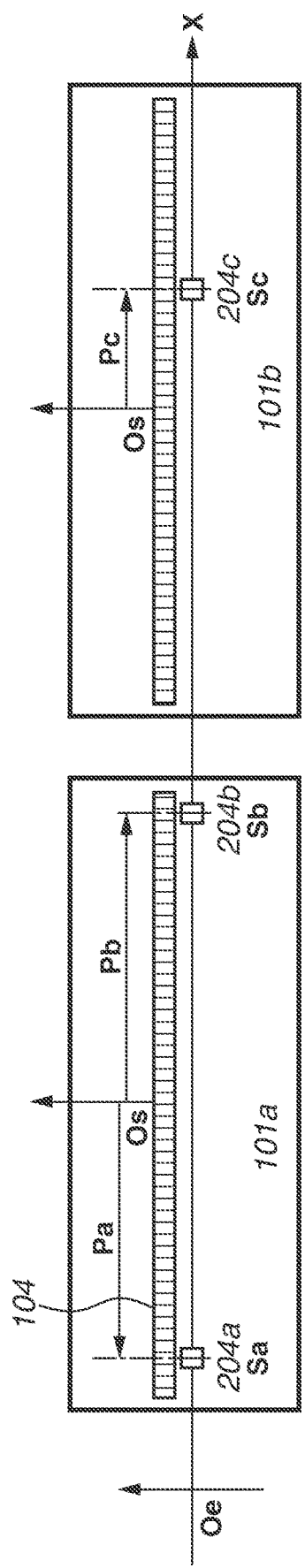
FIG. 9 is a schematic diagram illustrating a process by using a mover position calculation function according to the first exemplary embodiment of the present disclosure.

A process performed by the mover position calculation function 401 will be described with reference to FIG. 9. FIG. 9 is a schematic diagram illustrating a process by the mover position calculation function 401.

In FIG. 9, a reference point Oe is a positional reference of the stator 201 to which the linear encoders 204 are attached. Further, a reference point Os is a positional reference of the linear scale 104 attached to the mover 101. FIG. 9 illustrates a case where two movers 101a and 101b as the movers 101 are conveyed and three linear encoders 204a, 204b, and 204c as the linear encoders 204 are arranged. The linear scales 104 are respectively attached to corresponding positions on the movers 101a and 101b along the X-direction.

For example, one linear encoder 204c faces the linear scale 104 of the mover 101b in FIG. 9. The linear encoder 204c reads the linear scale 104 of the mover 101b and outputs a distance Pc. Further, the position of the linear encoder 204c with the reference point Oe being an origin point on the X-axis is a position Sc. Thus, a position Pos(101b) of the mover 101b is calculated by the following formula 7:

$$\text{Pos}(101b) = Sc - Pc \qquad (7).$$

For example, two linear encoders 204a and 204b face the linear scale 104 of the mover 101a illustrated in FIG. 9. The linear encoder 204a reads the linear scale 104 of the mover 101a and outputs a distance Pa. Further, the position of the linear encoders 204a with the reference point Oe being an origin point on the X-axis is a position Sa. Thus, a position Pos(101a) of the mover 101a on the X-axis based on an output of the linear encoder 204a is calculated by the following formula (8):

$$\text{Pos}(101a) = Sa - Pa \qquad (8)$$

Further, the linear encoder 204b reads the linear scale 104 of the mover 101b and outputs a distance Pb. Further, the position of the linear encoder 204b with the reference point Oe being an origin point on the X-axis is a position Sb. Thus, a position Pos(101a)' of the mover 101a on the X-axis based on an output of the linear encoder 204b is calculated by the following formula 9:

$$\text{Pos}(101a)' = Sb - Pb \qquad (9).$$

The positions of the linear encoders 204a and 204b are accurately measured in advance, so that the difference between two values Pos(101a) and Pos(101a)' is sufficiently small In such a case where the difference between the positions of the movers 101 on the X-axis based on the outputs of the two linear encoders 204 is sufficiently small, it is determined that the linear scale 104 of the same mover 101 is observed by the two linear encoders 204.

In a case where the plurality of linear encoders 204 faces the same mover 101, the position of the observed mover 101 is uniquely determined by calculating the mean value of positions based on outputs of the plurality of linear encoders 204.

The mover position calculation function 401 calculates a position X of the mover 101 in the X-direction based on outputs of the linear encoders 204 and determines the calculated position X as mover position information as described above.

Next, a process by the mover orientation calculation function 402 will be described with reference to FIG. 10.

Figure 10:
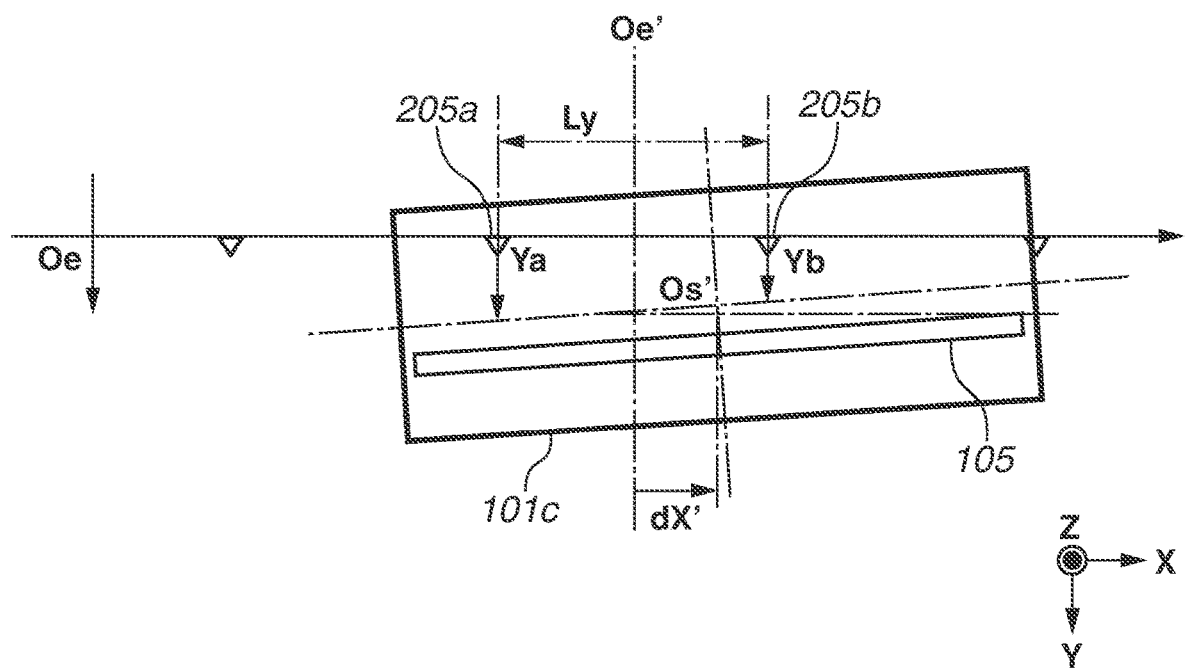
FIG. 10 is a schematic diagram illustrating a process by using a mover orientation calculation function according to the first exemplary embodiment of the present disclosure.

FIG. 10 illustrates a case where a mover 101c as the mover 101 is conveyed and Y-sensors 205a and 205b as the Y-sensors 205 are arranged. The two Y-sensors 205a and 205b face the Y-target 105 of the mover 101c illustrated in FIG. 10. A rotation amount Wz of the mover 101c about the Z-axis is calculated by the following formula 10:

$$Wz = (Ya - Yb)/Ly \qquad (10).$$

In formula 10, Ya and Yb are relative distance values that are respectively output by the two Y-sensors 205a and 205b, and Ly is an interval between the Y-sensors 205a and 205b.

There may be a case where three or more Y-sensors 205 face the Y-target 105 of the mover 101c depending on the position of the mover 101. In this case, a gradient of the Y-target 105, i.e., the rotation amount Wz about the Z-axis, can be calculated using a least-square method.

The mover orientation calculation function 402 calculates the rotation amount Wz about the Z-axis as orientation information about the mover 101 as described above.

Further, the mover orientation calculation function 402 can calculate a position Y of the mover 101 in the Y-direction as orientation information about the mover 101 as described below.

First, the calculation of the position Y of the mover 101 in the Y-direction will be described with reference to FIG. 10. In FIG. 10, the two Y-sensors 205 facing the mover 101c are Y-sensors 205a and 205b. Further, measurement values of the Y-sensors 205a and 205b are respectively denoted by Ya and Yb. Further, a midpoint between the positions of the Y-sensors 205a and 205b is denoted by Oe'. Further, the position of the mover 101c that is obtained through formulas 7 to 10 is denoted by Os', and the distance from Oe' to Os' is denoted by dX'. In this case, the position Y of the mover 101c in the Y-direction is approximately calculated by the following formula:

$$Y = (Ya + Yb)/2 - Wz \cdot dX'.$$

In a case where the rotation amount Wz with respect to the position Y is great, the approximation accuracy in the calculation is further increased.

Next, a process by the coil electric current calculation function 404 will be described with reference to FIGS. 1A and 1B. In the descriptions of forces used below, directions in which forces in the X- and Y-directions act are respectively denoted by x and y, the X plus side in FIGS. 1A and 1B is denoted by f, and the X minus direction is denoted by b.

In FIGS. 1A and 1B, forces acting on the permanent magnets 103 are specified as described below. The forces acting on the permanent magnet 103 are electromagnetic forces applied to the permanent magnets 103 by the plurality of coils 202 to which electric current is applied. An electromagnetic force in the X-direction, which is the conveyance direction of the mover 101, and an electromagnetic force in the Y-direction, which is a direction different from the X-direction, are applied to the permanent magnets 103 by the plurality of coils 202 to which electric current is applied. The forces acting on the permanent magnets 103 are expressed as follows.

Fxf: A force acting on the permanent magnet 103b in the X-direction.

Fyf: A force acting on the permanent magnet 103a in the Y-direction.

Fxb: A force acting on the permanent magnet 103c in the X-direction.

Fyb: A force acting on the permanent magnet 103d in the Y-direction.

Further, the force T applied to the mover 101 is expressed by formula 11 described below. In formula (11), Tx and Ty are two-axis components of the force T and are respectively an X-direction component and a Y-direction component of the force T. Further, Twz is a one-axis component of a moment and is a moment component about the Z-axis. The conveyance apparatus 1 according to the present exemplary embodiment controls the three-axis components (Tx, Ty, Twz) of the force T to control conveyance of the mover 101 while performing three-axis control of the orientation of the mover 101.

$$T = (Tx, Ty, Twz) \qquad (11).$$

Then, Tx, Ty, and Twz are respectively calculated by the following formulas (12a), (12b), and (12c).

$$Tx = Fxf + Fxb \quad (12a)$$

$$Ty = Fyf + Fyb \quad (12b)$$

$$Twz = (Fyf - Fyb) * rz3 \quad (12c)$$

Next, a method of determining an amount of electric current to be applied to the coils 202 from the forces acting on the permanent magnets 103 by the coil electric current calculation function 404 will be described below.

First, a case where a force in the Y-direction is to be applied to the permanent magnets 103a and 103d with polarities of N- and S-poles arranged alternately in the Y-direction will be described. The coils 202 are arranged so as to position the centers of the coils 202 in the Y-direction at the centers of the permanent magnets 103a and 103d in the Y-direction. In this way, forces acting on the permanent magnets 103a and 103d in the X- and Z-directions are little.

The position of the mover 101 is denoted by X, and the number of the coils 202 arranged in a row is denoted by j. Further, the magnitude of a force acting on the coil 202(j) in the Y-direction per unit electric current is denoted by Fy(j, X), and an electric current applied to the coil 202(j) is denoted by i(j). The coil 202(j) is the jth coil 202. In this case, an electric current i(j) is determined to satisfy formula (13) described below. Formula (13) is a formula representing a magnitude Fyb of the force acting on the permanent magnet 103d. For the other permanent magnet 103a, an electric current to be applied to the coils 202 is determined similarly.

$$\Sigma Fy(j,X) * i(j) = Fyb \quad (13)$$

In a case where the plurality of coils 202 exerts forces on the permanent magnets 103, the forces acting on the permanent magnets 103 are uniquely determined by prorating the electric current according to the magnitudes of the forces per unit electric current based on the forces that are respectively exerted by the coils 202.

Figure 11A:
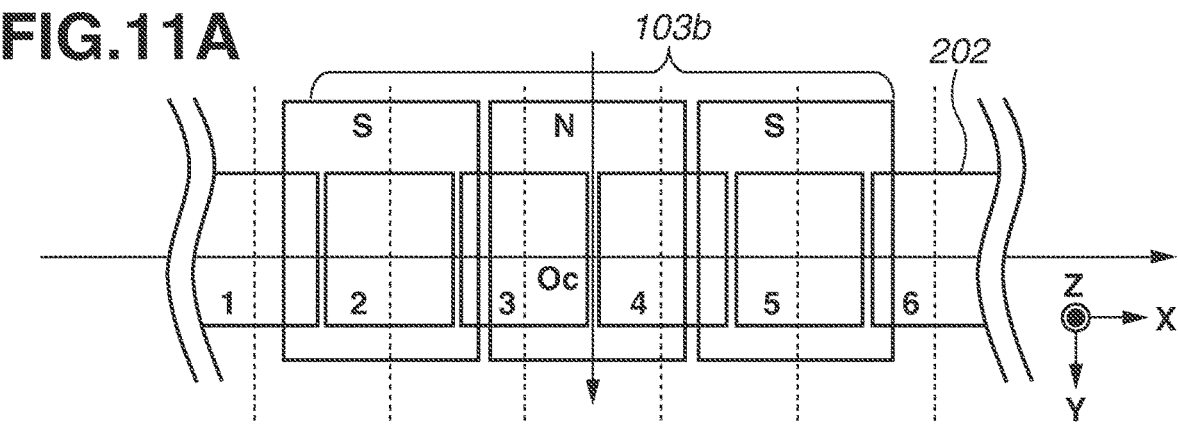
FIG. 11A is an extracted view of six coils facing permanent magnets with an X-axis being a horizontal axis and a Y-axis being a vertical axis.
Figure 11B:
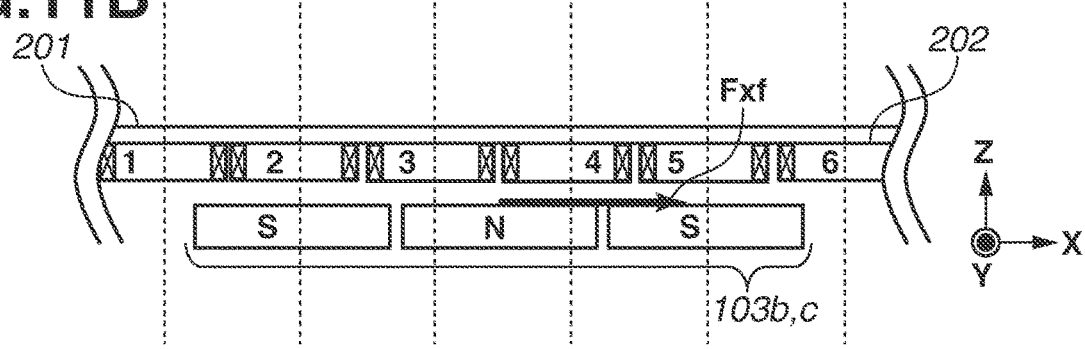
FIG. 11B is a view illustrating FIG. 11A viewed from the Y-direction.
Figure 11C:
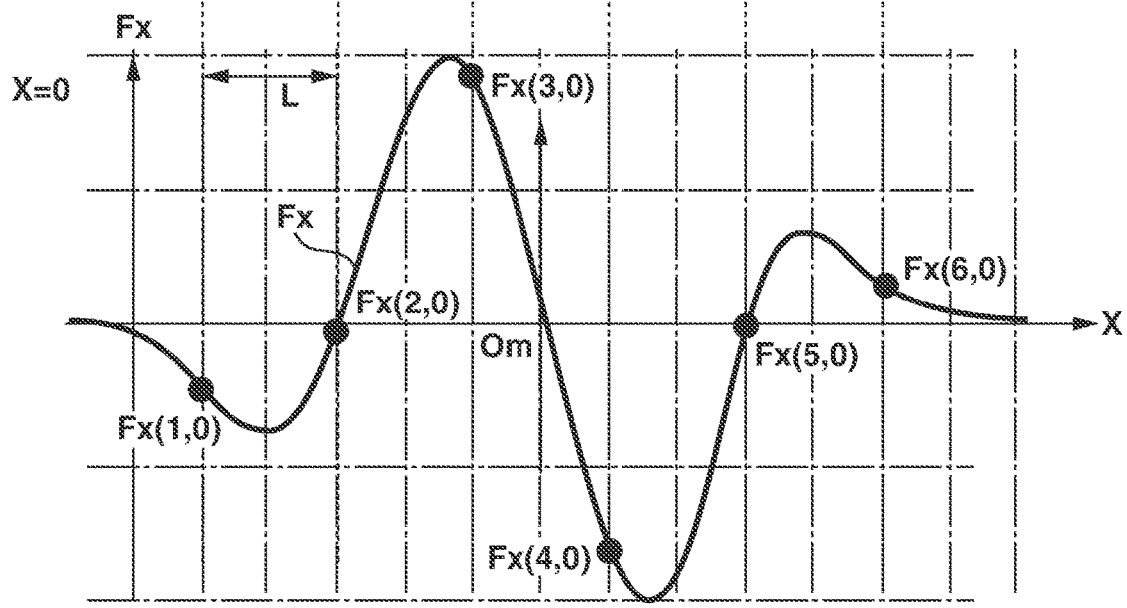
FIG. 11C is a graph schematically illustrating magnitudes of forces in an X-direction that are generated when a unit electric current is applied to the coils illustrated in FIGS. 11A and 11B.

Next, a method of applying a force in the X-direction to the permanent magnet 103b with polarities of N-, S-, and N-poles arranged alternately along the X-direction will be described. FIGS. 11A to 11C are schematic diagrams illustrating a method of applying a force in the X-direction to the permanent magnet 103b. The coil electric current calculation function 404 determines an electric current instruction value to be applied to the coils 202 to apply a force in the X-direction to the permanent magnet 103b as described below. A force in the X-direction can also be applied to the permanent magnet 103c similarly to the permanent magnet 103b.

The position of the mover 101 is denoted by X, and the number of the coils 202 arranged in a row is denoted by j. Further, the magnitude of a force acting on the coil 202(j) in the X-direction per unit electric current is denoted by Fx(j, X). Further, the magnitude of an electric current of the coil 202(j) is denoted by i(j). The coil 202(j) is the jth coil 202.

FIG. 11A is an extracted view of six coils 202 facing the permanent magnets 103b with the X-axis being a horizontal axis and the Y-axis being a vertical axis. FIG. 11B is a view illustrating the components illustrated in FIG. 11A viewed from the Y-direction. The coils 202 are given a number j from one to six in arrangement order in the X-direction, and hereinafter, each coil 202 is specified by expressing the coil 202 as, for example, the coil 202(1).

As illustrated in FIGS. 11A and 11B, the coils 202 are arranged at a pitch of a distance L. On the other hand, the permanent magnets 103 of the mover 101 are arranged at a pitch of a distance 3/2*L.

FIG. 11C is a graph schematically illustrating magnitudes of forces Fx in the X-direction that are generated when a unit electric current is applied to the coils 202 illustrated in FIGS. 11A and 11B.

For simplification, in FIGS. 11A, 11B, and 11C, an origin point Oc of the position of the coil 202 in the X-direction is defined as a midpoint between the coils 202(3) and 202(4), and a center Om of the permanent magnet 103b in the X-direction is defined as an origin point. Thus, FIGS. 11A, 11B, and 11C illustrate a case where the origin point Oc and the center Om are coincident with each other, i.e., X=0.

In this case, for example, the force acting on the coil 202(4) per unit electric current has the magnitude of Fx(4, 0) in the X-direction. Further, the force acting on the coil 202(5) per unit electric current has the magnitude of Fx(5, 0) in the X-direction.

The electric current values to be applied to the coils 202(1) to 202(6) are respectively denoted by i(1) to i(6). A magnitude Fxf of the force acting on the permanent magnet 103b in the X-direction is generally expressed by the following formula (14):

$$Fxf = Fx(1,X)*i(1) + Fx(2,X)*i(2) + Fx(3,X)*i(3) + Fx(4,X)*i(4) + Fx(5,X)*i(5) + Fx(6,X)*i(6) \quad (14)$$

By determining the electric current instruction value so that electric current values i(1) to i(6) that satisfy formula (14) are respectively applied to the coils 202(1) to 202(6), the force is independently applied in the X-direction to the permanent magnet 103b. The coil electric current calculation function 404 can determine the electric current instruction value to be applied to the coil 202(j) as described above in order to apply the force independently in the X-direction to the permanent magnet 103.

The force is applied in the X-direction to the mover 101 based on the electric current instruction value determined as described above. The mover 101 acquires a thrust force to move in the X-direction from the force applied in the X-direction to the mover 101 and moves in the X-direction.

As described above, the integrated controller 301 controls each of the three-axis components of the force to be applied to the mover 101 by controlling the electric current to be applied to the plurality of coils 202.

In a case where the center Oc of the coils 202 is moved with respect to the center Om of the permanent magnet 103b as a result of conveyance of the mover 101, i.e., X≠0, the coil 202 is selected based on the moved position. Further, calculations similar to those described above can be executed based on the force generated per unit electric current on the coil 202.

As described above, the integrated controller 301 determines the electric current instruction value to be applied to the plurality of coils 202 and controls the electric current instruction value to control contactless conveyance of the mover 101 over the stator 201 while performing three-axis control of the orientation of the mover 101 over the stator 201. In other words, the integrated controller 301 functions as a conveyance control unit that controls conveyance of the mover 101 and controls the electromagnetic forces applied to the permanent magnets 103 by the plurality of coils 202 to control contactless conveyance of the mover 101 over the stator 201. Further, the integrated controller 301 functions as an orientation control unit that controls the orientation of the mover 101 and performs three-axis control of the orientation of the mover 101 over the stator 201. All or some of the functions of the integrated controller 301 as a control apparatus can be replaced by the coil controller 302 or other control apparatuses.

As described above, according to the present exemplary embodiment, the plurality of coils 202 arranged in a row can apply a three-axis force including two-axis force components (Tx, Ty) and one-axis moment component (Twz) to the mover 101. In this way, conveyance of the mover 101 can be controlled while the orientation of the mover 101 is controlled in a three-axis manner According to the present exemplary embodiment, conveyance of the mover 101 can be controlled while the orientation of the mover 101 is controlled in three-axis manner by the coils 202 in one row, which is less than the number of three-axis components of the force that are variables to be controlled.

Thus, according to the present exemplary embodiment, the number of rows of the coils 202 can be reduced, so that the mover 101 can be conveyed while the orientation of the mover 101 is controlled without an increase in size and complication of the system. Furthermore, according to the present exemplary embodiment, the number of rows of the coils 202 can be reduced, so that a conveyance apparatus is configured with reduced costs and size.

While the configurations with a reduced number of rows (one row of coils) are illustrated as an example in the present exemplary embodiment, a plurality of rows of coils including the plurality of coils 202 along the X-direction can be included.

Figure 12A:
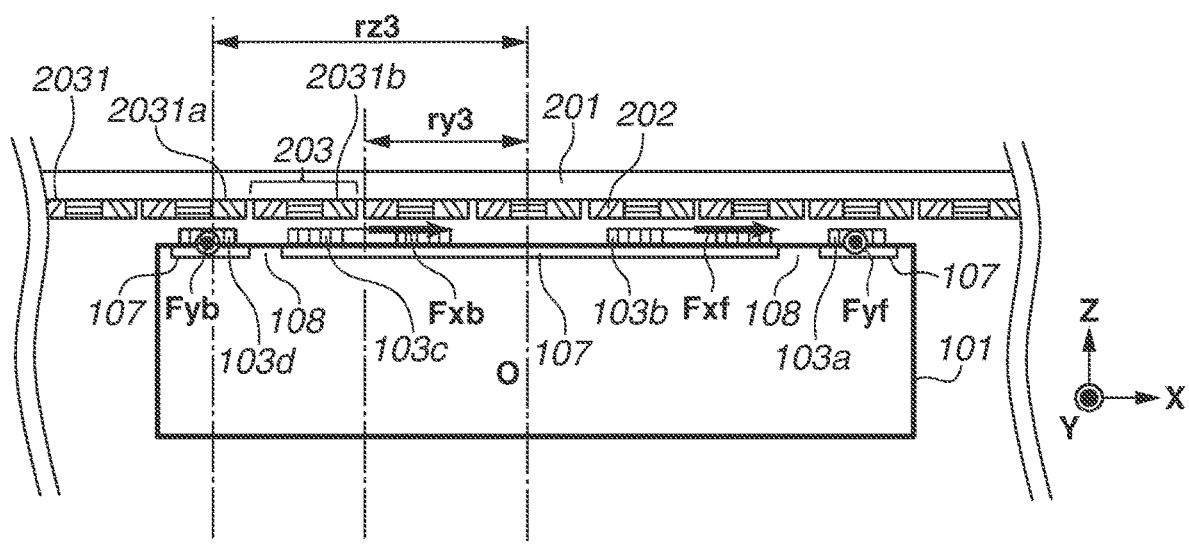
FIGS. 12A and 12B are side and top views illustrating a second exemplary embodiment of the present disclosure illustrating the second exemplary embodiment of the present disclosure.
Figure 12B:
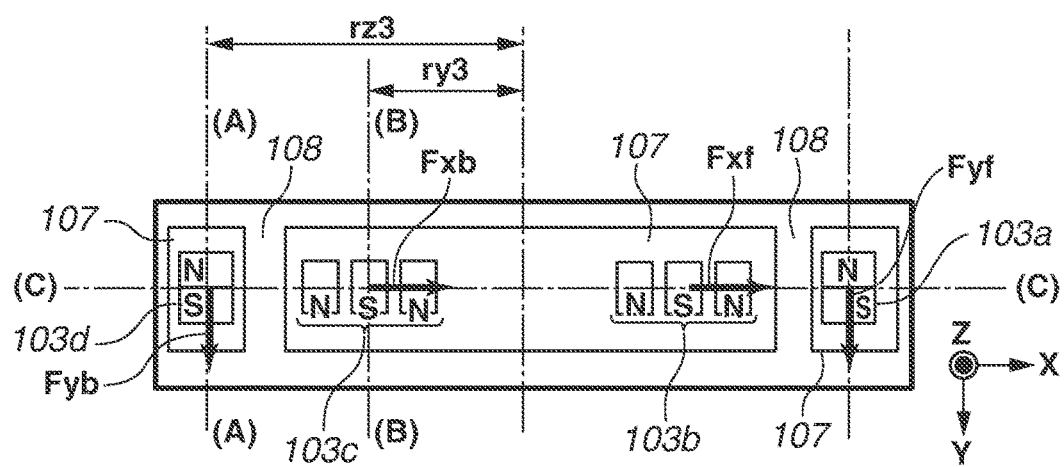

FIGS. 12A and 12B are schematic diagrams illustrating an entire configuration of a conveyance apparatus including the mover 101 and the stator 201 according to a second exemplary embodiment of the present disclosure. FIGS. 12A and 12B are extracted views of main portions of the mover 101 and the stator 201. Further, FIG. 12A illustrates a (C)-(C) cross section in FIG. 12B that is viewed from the Y-direction, and FIG. 12B illustrates the mover 101 viewed from the Z-direction. In the present exemplary embodiment, an example in which the permanent magnets 103a, 103d, 103b, and 103c of the mover 101 according to the first exemplary embodiment are attached to the yokes-for-magnet 107 provided separately on the top surface of the mover 101 will be described. More specifically, an arrangement in which the permanent magnet 103a is attached to a first yoke, the permanent magnets 103b and 103c are attached to a second yoke, and the permanent magnet 103d is attached to a third yoke, and the yokes are separated by a predetermined distance will be described below as an example. Each configuration acting similarly to that in the first exemplary embodiment is given the same reference numeral, and redundant descriptions thereof are omitted.

First, the magnetic circuit formed between the permanent magnets 103c and 103d in a case where the permanent magnets 103a, 103b, 103c, and 103d are attached to the same yoke-for-magnet 107 according to the first exemplary embodiment will be described with reference to FIG. 13. FIG. 13 is an enlarged view of a portion of FIG. 1 and is a conceptual diagram illustrating an example of a case where the mover 101 is moved toward the negative Y-direction by a predetermined amount specified by an illustrated arrow.

As illustrated in FIG. 13, permanent magnets 103c1, 103c2, and 103c3 are arranged in the permanent magnet 103c in this order from the side closer to the permanent magnet 103d. Further, the permanent magnets 103d1 and 103d2 are arranged in the permanent magnet 103d in this order from the positive Y-direction.

Further, as to the coils 202 facing the permanent magnets 103c and 103d, the coil 202 that faces the permanent magnet 103d1 will be referred to as "coil 202a", the coil 202 that faces the permanent magnet 103c1 as "coil 202b", and the coil 202 that faces the permanent magnet 103c2 as "coil 202c".

A thrust force in the Y-direction that acts on the mover 101 in this case with no electric current applied to the coils 202 will be described.

As illustrated in FIG. 13, magnetic paths 231a and 231b are formed between the mover 101 and the stator 201. FIG. 13 illustrates representative magnetic paths, and magnetic paths that are actually formed are not limited to those illustrated in FIG. 13. The magnetic path 231a is formed by the permanent magnet 103c1, the coils 202b and 202a, the permanent magnet 103d1, and the yoke-for-magnet 107. The magnetic path 231b is formed by the permanent magnet 103c1, the coils 202b and 202c, the permanent magnet 103c2, and the yoke-for-magnet 107.

Due to the magnetic paths 231a and 231b, the mover 101 side of the coil 202b acts as an S-pole, and the mover 101 side of the coil 202a acts as an N-pole. Magnetic paths are similarly formed in the X-direction, and a magnetic pole corresponding to an opposing permanent magnet is generated at the stator 201 side.

In this case, the stator 201 side of the permanent magnet 103c1 is an N-pole, and the mover 101 side of the coil 202b is an S-pole, so that an attracting force acts between the stator 201 and the mover 101. This causes a thrust force Fa1 to act on the mover 101 toward the positive Y-direction. This becomes a thrust force in a direction in which the centers of the stator 201 and the mover 101 is coincident with each other.

Further, due to the magnetic path 231a, the stator 201 side of the permanent magnet 103d1 is an S-pole, and the mover 101 side of the coil 202a is an N-pole, so that an attracting force acts between the stator 201 and the mover 101. This causes a thrust force Fb1 to act on the permanent magnet 103d1 toward the negative Y-direction.

Similarly, due to the magnetic path 231b, the stator 201 side of the permanent magnet 103c2 is an S-pole, and the mover 101 side of the coil 202c is an N-pole, so that an attracting force acts between the stator 201 and the mover 101. This causes a thrust force Fc1 to act on the permanent magnet 103c2 toward the positive Y-direction.

In this case, the thrust forces Fa1 and Fc1 act in the same direction, but the thrust force Fb1 acts in the opposite direction and acts to reduce the thrust force in the direction in which the centers of the stator 201 and the mover 101 are coincident with each other.

Figure 14:
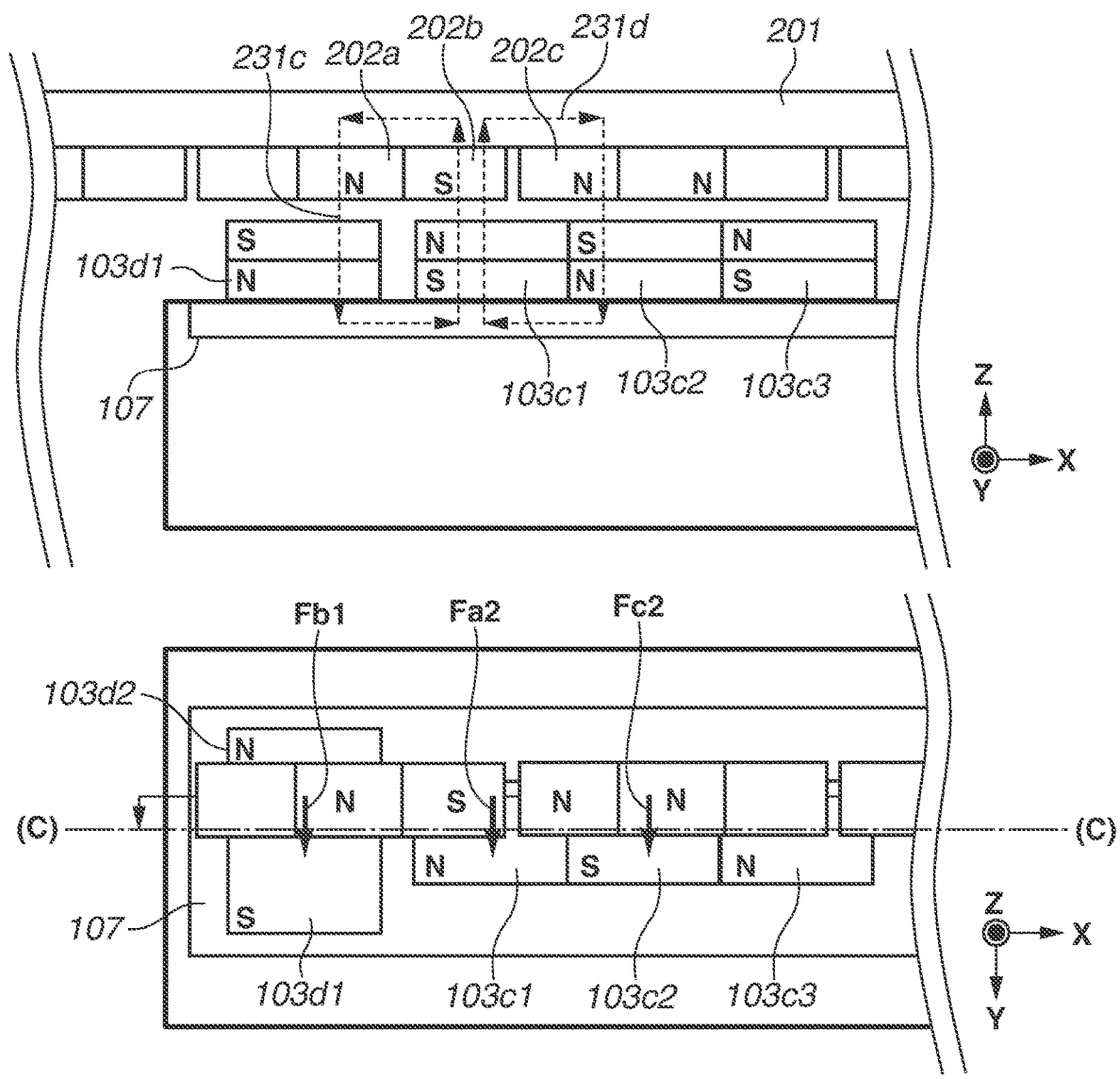
FIG. 14 is side and top views illustrating thrust forces in the Y-direction according to the second exemplary embodiment of the present disclosure.

Next, a conceptual diagram illustrating an example of a case where the mover 101 is moved toward the positive Y-direction by a predetermined amount equal to the movement amount in FIG. 13 is illustrated in FIG. 14. FIG. 14 is an enlarged view of portions in FIGS. 12A and 12B.

As illustrated in FIG. 14, magnetic paths 231c and 231d are formed between the mover 101 and the stator 201. FIG. 14 illustrates representative magnetic paths, and magnetic paths that are formed are not limited to those illustrated in FIG. 14. The magnetic path 231c is formed by the permanent magnet 103c1, the coils 202b and 202a, the permanent magnet 103d2, and the yoke-for-magnet 107. The magnetic path 231d is formed by the permanent magnet 103c1, the coils 202b and 202c, the permanent magnet 103c2, and the yoke-for-magnet 107.

Due to the magnetic paths 231c and 231d, the mover 101 side of the coil 202b acts as an S-pole, and the mover 101 side of the coil 202a acts as an N-pole. Magnetic paths are similarly formed in the X-direction, and a magnetic pole corresponding to an opposing permanent magnet is generated at the stator 201 side.

In this case, the stator 201 side of the permanent magnet 103c1 is an N-pole, and the mover 101 side of the coil 202b is an S-pole, so that an attracting force acts between the stator 201 and the mover 101. This causes a thrust force Fa2 to act on the permanent magnet 103c1 toward the positive Y-direction. This becomes a thrust force in a direction in which the centers of the stator 201 and the mover 101 is coincident with each other.

Further, due to the magnetic path 231c, the stator 201 side of the permanent magnet 103d2 is an N-pole, and the mover 101 side of the coil 202a is an N-pole, so that a repelling force acts between the stator 201 and the mover 101. This causes a thrust force Fb2 to act on the permanent magnet 103d2 toward the positive Y-direction.

Similarly, due to the magnetic path 231d, the stator 201 side of the permanent magnet 103c2 is an S-pole, and the mover 101 side of the coil 202c is an N-pole, so that an attracting force acts between the stator 201 and the mover 101. This causes a thrust force Fc2 to act on the permanent magnet 103c2 toward the positive Y-direction.

In this case, the thrust forces Fa2, Fb2, and Fc2 are forces acting in the same direction, so that unlike the thrust forces Fb2 and Fb1, the thrust forces Fa2, Fb2, and Fc2 act to increase the thrust force in the direction in which the centers of the stator 201 and the mover 101 is coincident with each other.

From the foregoing descriptions, it is understood that there arises a disparity between the thrust force in the Y-direction at the position to which the mover 101 is moved by a predetermined amount in the positive Y-direction and the thrust force in the Y-direction at the position to which the mover 101 is moved by the predetermined amount in the negative Y-direction.

Next, a magnetic circuit according to the present exemplary embodiment, in which the permanent magnets 103a, 103b, 103c, and 103d are attached to the yokes-for-magnet 107 provided separately, will be described with reference to FIG. 15. In the present exemplary embodiment, as illustrated in FIG. 15, the permanent magnets 103a, 103b, 103c, and 103d are attached to the yokes-for-magnet 107 provided separately on the top surface of the mover 101. The permanent magnets 103b and 103c may be attached to a different yokes-for-magnet 107. Each yoke-for-magnet 107 is made of a material with a great magnetic permeability, e.g., iron.

With the foregoing arrangement, a gap 108 with a high magnetic resistance formed by including a gap in the yokes-for-magnet 107 is formed between the permanent magnets 103a and 103b and between the permanent magnets 103c and 103d arranged along the X-direction.

The gap 108 between the permanent magnets 103c and 103d has a significantly high magnetic resistance, so that magnetic fluxes that pass through the magnetic path 231a and the magnetic path 231c illustrated in FIG. 14 are reduced.

In this case, a force Fa3 acts on the permanent magnet 103c1, and a force Fc3 acts on the permanent magnet 103c2 as in FIG. 13. However, since the magnetic fluxes that pass through the magnetic path 231a decreases, a force Fb3 acting on the permanent magnet 103d2 decreases compared to the force Fb1.

Similarly, if magnetic fluxes that pass through the magnetic path 231c decrease, the force Fb2 illustrated in FIG. 14 decreases. This reduces disparities in thrust forces in the Y-direction.

Figure 16:
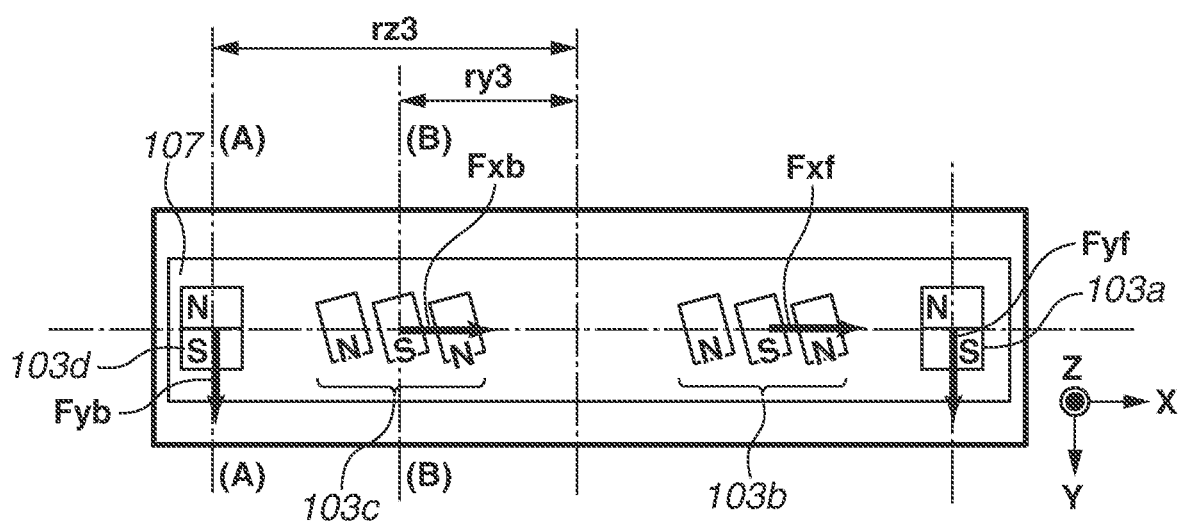
FIG. 16 is a top view of a mover according to the second exemplary embodiment of the present disclosure.

Further, a conveyance apparatus with a movable magnet type linear motor can reduce cogging by inclining permanent magnets at a predetermined angle with respect to the conveyance direction as illustrated in FIG. 16.

In the case where the permanent magnets are inclined at the predetermined angle, however, the distance between the permanent magnets 103d and 103c becomes short. As a result, there arises a greater disparity in thrust force due to a magnetic path formed between the permanent magnets 103d and 103c. Even in this case, disparities in thrust force are still reduced by an advantage or benefit of the present exemplary embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-019513, filed Feb. 7, 2020, which is hereby incorporated by reference herein in its entirety.

What is claimed is:

1. A conveyance apparatus comprising:
a stator including a plurality of coils arranged along a first direction; and
a mover configured to move along the first direction and including a plurality of magnet groups arranged in a row along the first direction,
wherein the plurality of magnet groups has a first magnet group that includes a plurality of first magnets arranged to alternate polarities along the first direction, and a second magnet group that includes a plurality of second magnets arranged to alternate polarities along a second direction intersecting with the first direction,
wherein at least one of the plurality of coils includes a core, a wire-wound portion wound around the core, and a yoke, and
wherein the yoke is adjacent to an outer periphery of the wire-wound portion in the second direction.

2. The conveyance apparatus according to claim 1, wherein the yoke is configured to sandwich at least one of the plurality of coils in the second direction.

3. The conveyance apparatus according to claim 1, wherein the yoke is connected to the core, and
wherein a connected portion of the yoke and the core (i) is a surface of the core opposite to a surface of the core that faces the mover or (ii) is a side surface of the core that faces the second direction.

4. The conveyance apparatus according to claim 1, wherein the yoke is made of a magnetic material or a material with relative magnetic permeability of 1000 or more.

5. The conveyance apparatus according to claim 1, wherein the mover includes a first yoke on which the first magnet group is arranged and a second yoke on which the second magnet group is arranged, and
wherein the first yoke and the second yoke are separately arranged.

6. The conveyance apparatus according to claim 5, wherein the first yoke and the second yoke are made of a magnetic material or a material with relative magnetic permeability of 1000 or more.

7. A method of manufacturing an article, the method comprising:
processing a work conveyed by a conveyance apparatus; and
manufacturing the article from processing the work, wherein the conveyance apparatus is according to the conveyance apparatus of claim 1.

8. The conveyance apparatus according to claim 1, wherein the yoke is arranged in the second direction to sandwich the plurality of coils.

9. The conveyance apparatus according to claim 1, wherein the mover includes a first surface, and the first magnet group and the second magnet group are arranged on the first surface.

10. The conveyance apparatus according to claim 9, wherein the first surface is an upper surface.

11. The conveyance apparatus according to claim 1, wherein polarities of the plurality of first magnets adjacent to each other in the first direction are different, and
wherein polarities of the plurality of second magnets adjacent to each other in the second direction are different.

12. The conveyance apparatus according to claim 1, wherein the second magnet group is provided closer to an end of the mover than the first magnet group in the first direction.

13. The conveyance apparatus according to claim 1, wherein the first magnet group includes a plurality of first magnet groups, the second magnet group includes a plurality of second magnet groups, and at least one of the plurality of first magnet groups is provided between two second magnet groups of the plurality of second magnet groups.

14. A conveyance apparatus comprising:
a stator including a plurality of coils arranged along a first direction;
a mover configured to move along the first direction and including a plurality of magnet groups arranged in a row along the first direction, wherein the plurality of magnet groups has a first magnet group that includes a plurality of first magnets arranged to alternate polarities along the first direction, and a second magnet group that includes a plurality of second magnets arranged to alternate polarities along a second direction intersecting with the first direction;
a first yoke on which the first magnet group is arranged; and
a second yoke on which the second magnet group is arranged,
wherein the first yoke and the second yoke are separately arranged with a predetermined distance.

15. A method of manufacturing an article, the method comprising:
processing a work conveyed by a conveyance apparatus; and
manufacturing the article from processing the work, wherein the conveyance apparatus is according to the conveyance apparatus of claim 14.

16. The conveyance apparatus according to claim 14, wherein the mover includes a first surface, and the first magnet group and the second magnet group are arranged on the first surface.

17. The conveyance apparatus according to claim 16, wherein the first surface is an upper surface.

18. The conveyance apparatus according to claim 14, wherein polarities of the plurality of first magnets adjacent to each other in the first direction are different, and
wherein polarities of the plurality of second magnets adjacent to each other in the second direction are different.

19. The conveyance apparatus according to claim 14, wherein the second magnet group is provided closer to an end of the mover than the first magnet group in the first direction.

20. The conveyance apparatus according to claim 14, wherein the first magnet group includes a plurality of first magnet groups, the second magnet group includes a plurality of second magnet groups, and at least one of the plurality of first magnet groups is provided between two second magnet groups of the plurality of second magnet groups.

* * * * *